US012647629B1

(12) United States Patent
Suryakumar et al.

(10) Patent No.: US 12,647,629 B1
(45) Date of Patent: Jun. 2, 2026

(54) CENTRALIZED VIDEO TRANSFORMER FOR CONTENT DELIVERY NETWORKS

(71) Applicant: Oracle International Corporation, Redwood Shores, CA (US)

(72) Inventors: Arvind Suryakumar, Seattle, WA (US); Yuchieh Lin, Los Angeles, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/057,158

(22) Filed: Feb. 19, 2025

(51) Int. Cl.
*H04N 21/239* (2011.01)
*H04L 67/566* (2022.01)
*H04N 21/2183* (2011.01)

(52) U.S. Cl.
CPC ....... *H04N 21/2393* (2013.01); *H04L 67/566* (2022.05); *H04N 21/2183* (2013.01)

(58) Field of Classification Search
CPC ............ H04N 21/2393; H04N 21/2183; H04L 67/566
USPC .......................................................... 725/32
See application file for complete search history.

(56) References Cited

U.S. PATENT DOCUMENTS

| | | | | |
|---|---|---|---|---|
| 7,240,100 B1* | 7/2007 | Wein | .................... | H04L 67/1001 |
| | | | | 709/214 |
| 8,588,111 B1* | 11/2013 | Kridlo | ............... | H04M 3/42221 |
| | | | | 370/259 |
| 10,142,386 B2* | 11/2018 | Gordon | ................. | H04L 65/756 |
| 10,402,046 B2* | 9/2019 | Pippuri | ................. | G06F 16/258 |
| 10,735,489 B1* | 8/2020 | Joliveau | ............... | H04L 65/612 |
| 12,367,240 B1* | 7/2025 | Zhu | .......................... | G06N 3/08 |
| 2007/0156845 A1* | 7/2007 | Devanneaux | ....... | G06F 16/9574 |
| | | | | 709/217 |
| 2012/0209942 A1* | 8/2012 | Zehavi | .................... | H04L 67/63 |
| | | | | 709/213 |
| 2023/0135699 A1* | 5/2023 | Liao | ........................ | H04W 4/50 |
| | | | | 370/252 |
| 2023/0308853 A1* | 9/2023 | Ding | .................... | G06F 9/5072 |

* cited by examiner

*Primary Examiner* — Sahar Aqil Riaz
(74) *Attorney, Agent, or Firm* — Baker Botts L.L.P.

(57) ABSTRACT

In one embodiment, software is operable when executed to receive a request for a video fragment from a CDN by a mid-tier video transformer operating between the CDN and servers, determine a type of the request, and identify configuration rules among configuration rules are centralized in the mid-tier video transformer based on the type of the request to transform the request. The software is further operable when executed to determine a media type of the video fragment based on the configuration rules, identify a server based on the media type, and route a transformed request to the server by the mid-tier video transformer.

20 Claims, 10 Drawing Sheets

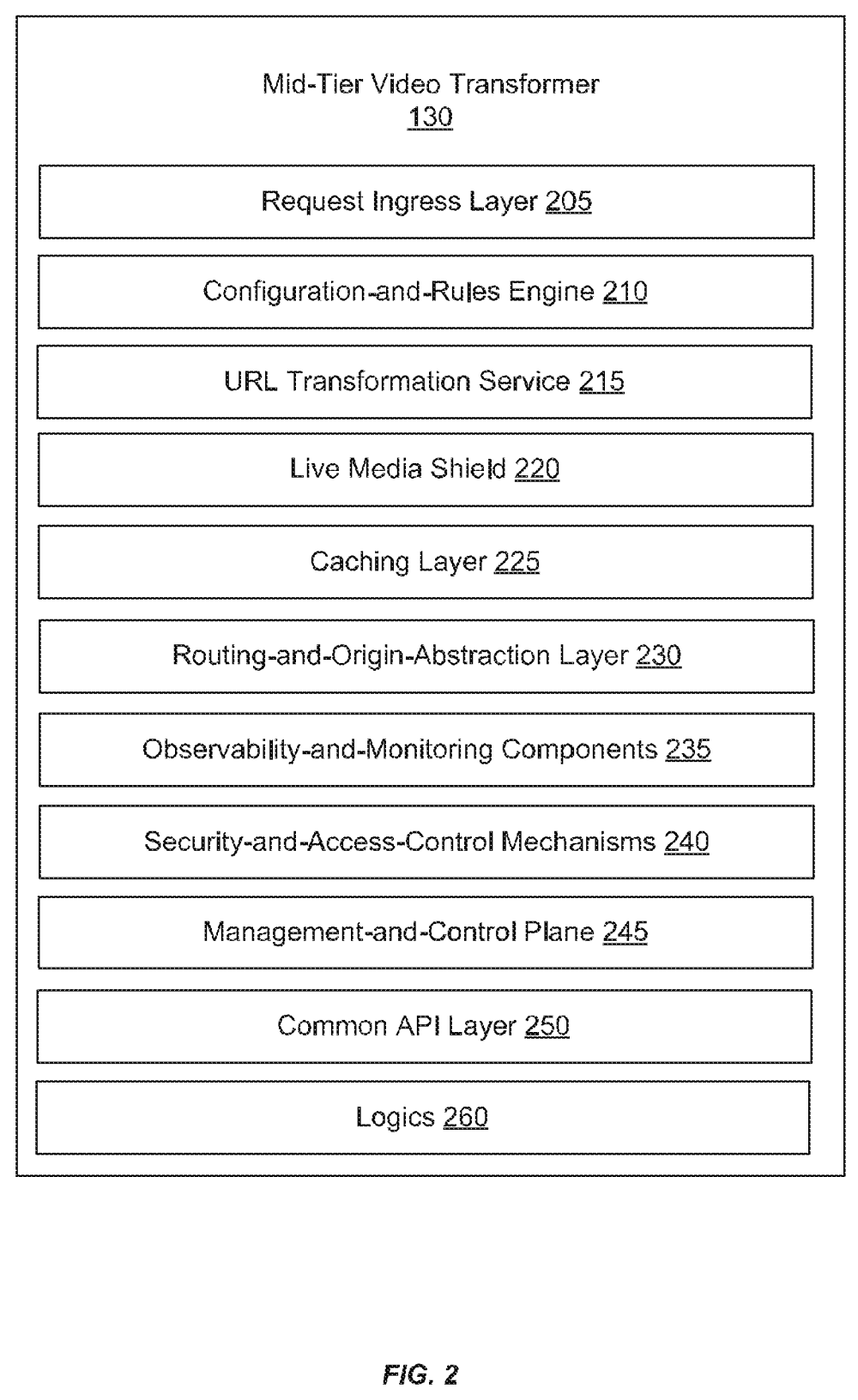

Mid-Tier Video Transformer
130

Request Ingress Layer 205

Configuration-and-Rules Engine 210

URL Transformation Service 215

Live Media Shield 220

Caching Layer 225

Routing-and-Origin-Abstraction Layer 230

Observability-and-Monitoring Components 235

Security-and-Access-Control Mechanisms 240

Management-and-Control Plane 245

Common API Layer 250

Logics 260

*FIG. 2*

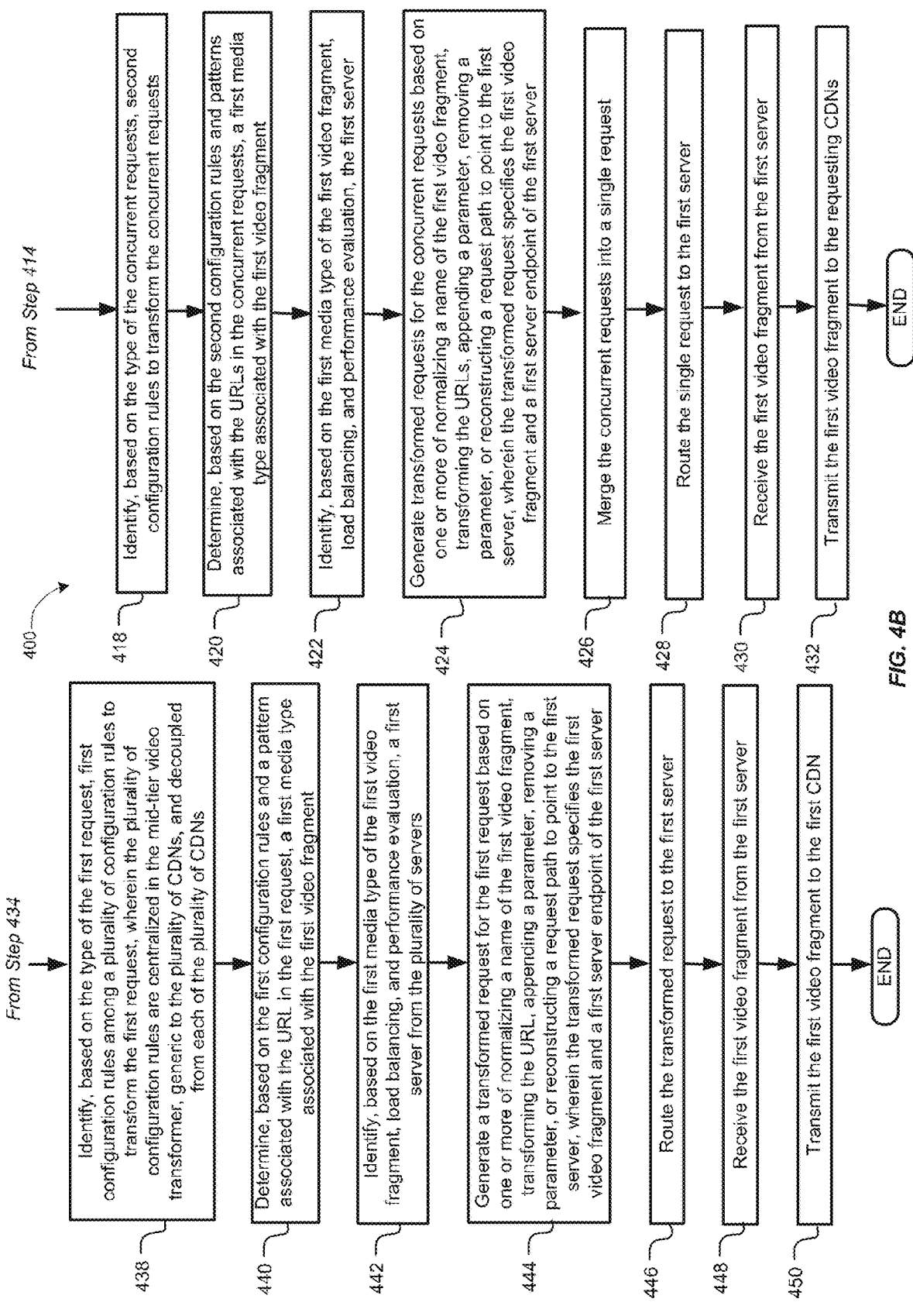

*From Step 414*

418 — Identify, based on the type of the concurrent requests, second configuration rules to transform the concurrent requests 420 — Determine, based on the second configuration rules and patterns associated with the URLs in the concurrent requests, a first media type associated with the first video fragment 422 — Identify, based on the first media type of the first video fragment, load balancing, and performance evaluation, the first server 424 — Generate transformed requests for the concurrent requests based on one or more of normalizing a name of the first video fragment, transforming the URLs, appending a parameter, removing a parameter, or reconstructing a request path to point to the first server, wherein the transformed request specifies the first video fragment and a first server endpoint of the first server 426 — Merge the concurrent requests into a single request 428 — Route the single request to the first server 430 — Receive the first video fragment from the first server 432 — Transmit the first video fragment to the requesting CDNs

END

*From Step 434*

438 — Identify, based on the type of the first request, first configuration rules among a plurality of configuration rules to transform the first request, wherein the plurality of configuration rules are centralized in the mid-tier video transformer, generic to the plurality of CDNs, and decoupled from each of the plurality of CDNs 440 — Determine, based on the first configuration rules and a pattern associated with the URL in the first request, a first media type associated with the first video fragment 442 — Identify, based on the first media type of the first video fragment, load balancing, and performance evaluation, a first server from the plurality of servers 444 — Generate a transformed request for the first request based on one or more of normalizing a name of the first video fragment, transforming the URL, appending a parameter, removing a parameter, or reconstructing a request path to point to the first server, wherein the transformed request specifies the first video fragment and a first server endpoint of the first server 446 — Route the transformed request to the first server 448 — Receive the first video fragment from the first server 450 — Transmit the first video fragment to the first CDN

END

CENTRALIZED VIDEO TRANSFORMER FOR CONTENT DELIVERY NETWORKS

TECHNICAL FIELD

This disclosure generally relates to content delivery networks and, more specifically, to improving the efficiency of video streaming by content delivery networks.

BACKGROUND

A content delivery network (CDN) is a system of servers that work together to deliver content to users more quickly and reliably. CDNs distribute user requests and serve content from servers that are geographically close to the user. This reduces the distance that data has to travel, which improves performance and reduces latency. CDNs can improve the performance of websites, especially those with high bandwidth or large files such as videos. CDNs can also improve the performance of content management systems (CMSs). CDNs are used to deliver different types of content, including Hypertext Markup Language (HTML) pages, images, videos, and software. CDNs can be used to support a wide range of cloud computing services, including software-as-a-service (SaaS), infrastructure-as-a-service (IaaS), platform-as-a-service (PaaS), and business-process-as-a-service (BPaaS).

BRIEF DESCRIPTION OF THE DRAWINGS

FIG. 2 illustrates the system components of a mid-tier video transformer, according to at least one embodiment.

FIGS. 4A-4B illustrate a method for video transformation for CDNs, according to at least one embodiment.

DESCRIPTION OF EXAMPLE EMBODIMENTS

Overview

Figure 1:
FIG. 1 illustrates a system architecture for video transformation for CDNs, according to at least one embodiment.
Figure 1:
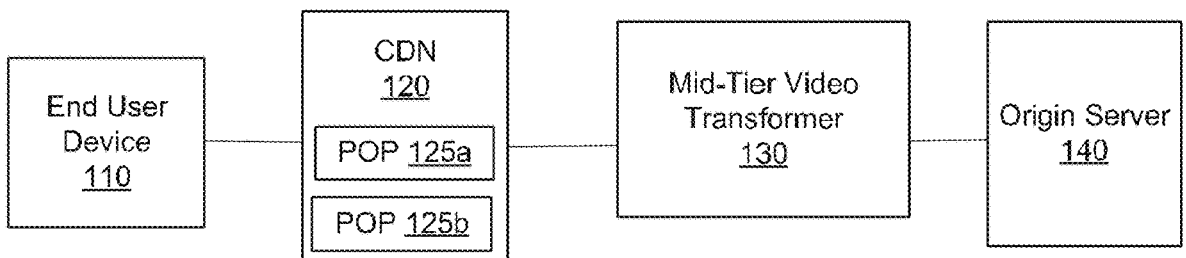

According to an embodiment, one or more computer-readable non-transitory storage media may embody software executable for the following operations. The operations may include receiving, by a mid-tier video transformer, a first request for a first video fragment from a first content delivery network (CDN) among a plurality of CDNs. The mid-tier video transformer may operate between the plurality of CDNs and a plurality of servers. The operations may also include determining, by the mid-tier video transformer, a type of the first request based on one or more parameters associated with the first request. The operations may additionally include identifying, based on the type of the first request and by the mid-tier video transformer, one or more first configuration rules among a plurality of configuration rules to transform the first request. The plurality of configuration rules may be centralized in the mid-tier video transformer. The operations may also include determining, based on the one or more first configuration rules and by the mid-tier video transformer, a first media type associated with the first video fragment. The operations may further include identifying, based on the first media type of the first video fragment and by the mid-tier video transformer, a first server from the plurality of servers. The operations may additionally include routing, by the mid-tier video transformer, a transformed request to the first server.

In certain embodiments, the operations may further include receiving, by the mid-tier video transformer, the first video fragment from the first server. The operations may also include transmitting, by the mid-tier video transformer, the first video fragment to the first CDN.

In certain embodiments, the plurality of configuration rules may be generic to the plurality of CDNs.

In certain embodiments, the plurality of configuration rules may be decoupled from each of the plurality of CDNs.

In certain embodiments, the type of the first request may be video-on-demand (VOD).

In certain embodiments, the operations may include receiving, by the mid-tier video transformer, a plurality of concurrent second requests from the plurality of CDNs. The operations may also include determining, by the mid-tier video transformer, the plurality of concurrent second requests request a same second video fragment. The operations may additionally include merging the plurality of concurrent second requests into a single request. The operations may further include routing, by the mid-tier video transformer, the single request to a second server.

In certain embodiments, the operations may include receiving, by the mid-tier video transformer, the same second video fragment from the second server. The operations may also include transmitting, by the mid-tier video transformer, the same second video fragment to the plurality of CDNs.

In certain embodiments, the mid-tier video transformer may include a cache configured to store recent video fragments. The operations may further include, upon receiving the first request for the first video fragment, searching the cache for the first video fragment.

In certain embodiments, the first server may be associated with a first server endpoint. Accordingly, the transformed request may specify the first video fragment and the first server endpoint.

In certain embodiments, the operations may include receiving, by the mid-tier video transformer, a plurality of second requests for a plurality of second video fragments from each of the plurality of CDNs. The operations may also include identifying, by the mid-tier video transformer, one or more respective second configuration rules among the plurality of configuration rules to transform each of the plurality of second requests. The operations may further include determining, based on the one or more respective second configuration rules and by the mid-tier video transformer, a respective second media type associated with each of the plurality of second video fragments. The operations may also include identifying, based on the respective second media type of each of the plurality of second video fragments and by the mid-tier video transformer, one or more second servers from the plurality of servers. The operations may further include routing, by the mid-tier video transformer, a plurality of transformed requests corresponding to the plurality to second requests to the one or more second servers.

In certain embodiments, the plurality of CDNs may operate on a cloud infrastructure.

In certain embodiments, the first request may include a URL. The operations may further include identifying, by the mid-tier video transformer, a pattern associated with the URL. Accordingly, determining the first media type associated with the first video fragment may be further based on the pattern associated with the URL.

In certain embodiments, the operations may include generating, by the mid-tier video transformer, the transformed request based on one or more of normalizing a name of the first video fragment, transforming the URL, appending a parameter, removing a parameter, or reconstructing a request path to point to the first server.

In certain embodiments, the operations may include determining, by the mid-tier video transformer, that the first CDN is authorized to use functions provisioned by the mid-tier video transformer.

In certain embodiments, the operations may include receiving, by the mid-tier video transformer, a plurality of second requests from the first CDN. The operations may also include calculating a request rate associated with the plurality of second requests. The operations may further include determining the request rate exceeds a rate limit. The operations may additionally include declining the plurality of second requests or suspending one or more of the plurality of second requests for a period of time.

In certain embodiments, the operations may include requesting, by the mid-tier video transformer, validations for the plurality second requests from the first CDN prior to declining the plurality of second requests or suspending the one or second requests.

In certain embodiments, one or more second servers may store the first media type of video fragments. The operations may further include determining, by the mid-tier video transformer, a load balancing between the first server and the one or more second servers. Identifying the first server may be further based on the load balancing.

In certain embodiments, the operations may further include determining a failure associated with the first server. The operations may also include routing, by the mid-tier video transformer, the transformed request to one of the one or more second servers.

In certain embodiments, the operations may include requesting, by the mid-tier video transformer, the appropriate playback features supported for the property, wherein playback features can be classified as the nature of advertisements (dynamic versus static), supported quality levels (4K vs HD), etc.

In certain embodiments, the operations may include requesting, by the mid-tier video transformer, the appropriate geographical region supported for the property.

According to another embodiment, a system may include one or more processors and a non-transitory memory coupled to the processors comprising instructions that, when executed by the one or more processors, cause the one or more processors to execute the following operations. The operations may include receiving, by a mid-tier video transformer, a first request for a first video fragment from a first content delivery network (CDN) among a plurality of CDNs. The mid-tier video transformer may operate between the plurality of CDNs and a plurality of servers. The operations may also include determining, by the mid-tier video transformer, a type of the first request based on one or more parameters associated with the first request. The operations may additionally include identifying, based on the type of the first request and by the mid-tier video transformer, one or more first configuration rules among a plurality of configuration rules to transform the first request. The plurality of configuration rules may be centralized in the mid-tier video transformer. The operations may additionally include determining, based on the one or more first configuration rules and by the mid-tier video transformer, a first media type associated with the first video fragment. The operations may further include identifying, based on the first media type of the first video fragment and by the mid-tier video transformer, a first server from the plurality of servers. The operations may also include routing, by the mid-tier video transformer, a transformed request to the first server.

According to another embodiment, a method may include the following operations. The operations may include receiving, by a mid-tier video transformer, a first request for a first video fragment from a first content delivery network (CDN) among a plurality of CDNs. The mid-tier video transformer may operate between the plurality of CDNs and a plurality of servers. The operations may also include determining, by the mid-tier video transformer, a type of the first request based on one or more parameters associated with the first request. The operations may additionally include identifying, based on the type of the first request and by the mid-tier video transformer, one or more first configuration rules among a plurality of configuration rules to transform the first request. The plurality of configuration rules may be centralized in the mid-tier video transformer. The operations may additionally include determining, based on the one or more first configuration rules and by the mid-tier video transformer, a first media type associated with the first video fragment. The operations may further include identifying, based on the first media type of the first video fragment and by the mid-tier video transformer, a first server from the plurality of servers. The operations may also include routing, by the mid-tier video transformer, a transformed request to the first server.

Technical advantages of certain embodiments of this disclosure may include one or more of the following. Certain disclosed systems and methods have dual-mode functionality, including acting as a media shield for real-time stream management and operating as a Uniform Resource Locator (URL) transformer to intelligently route fragment requests. Certain disclosed systems and methods use centralized transformation logic by consolidating logic in a single, scalable layer, thereby removing the need for custom implementation of CDN-specific transformation logic. With centralized transformation logic, certain disclosed systems and methods allow faster CDN onboarding and scalability (e.g., providers can expand to new content types and features without modifying CDN logic, easing the complexity of scaling). Certain disclosed systems and methods allow simplified feature rollouts. Cross-CDN features and behaviors can be tested and validated within the transformer layer, reducing the risk of breaking functionality. Certain disclosed systems and methods reduce the development and testing costs of maintaining multiple CDN transformation logics. Certain disclosed systems and methods further improve flexibility as the centralized logic offers the flexibility to adapt to new CDN requirements or content types without large-scale updates.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

Streaming platforms may distribute dynamic content such as advertisements, animations, and main videos through multiple CDNs. Each type of content may be stored in servers at different locations, and the logic to fetch content at the correct time may reside within the CDNs. As providers expand content types and add new CDNs, maintaining this logic becomes complex, leading to delays in feature rollouts and increasing development costs. This can cause functionality and scalability challenges risks, as each CDN may require custom implementation.

To address these technical challenges, certain embodiments disclosed herein utilize a mid-tier video transformer to centralize the video transformation logic, removing the logic from individual CDNs and implementing the logic within a single, manageable layer. CDN requests can be transformed at this layer into requests that are routed to the correct origin server. The mid-tier video transformer can decouple CDN-specific logic, making onboarding new CDNs faster and allowing providers to test new cross-CDN features more quickly without reworking the logic within each CDN.

In particular embodiments, the mid-tier video transformer may be a video processing layer that operates between a CDN and the origin server to simplify the management of video content streaming. The mid-tier video transformer can be utilized for live video streaming. For this functionality, the mid-tier video transformer may act as a media shield by collapsing player requests for the latest live video fragments, reducing unnecessary load and streamlining requests.

The mid-tier video transformer may be utilized for VOD. For this functionality, the mid-tier video transformer can function as a URL transformation layer, interpreting the logic required to extract URL hints for various media fragments (such as advertisements, pre-roll content, or post-roll content) and redirecting those requests to the correct origin server.

FIG. 1 illustrates a system architecture 100 for video transformation for CDNs, according to at least one embodiment. System architecture 100 may include an end user device 110, a CDN 120, a mid-tier video transformer 130, and an origin server 140. It should be noted that although this disclosure describes one end user device 110, one CDN 120, one mid-tier video transformer 130, and one origin server 140 in FIG. 1, any suitable number (e.g., more than one) of end user devices, CDNs, mid-tier video transformers, and origin servers can be implemented for video transformations for CDNs.

The end user device 110 may be used for video streaming or playback. The end user device 110 may transmit a request for a video segment to the CDN 120.

The CDN 120 may include a plurality of geographically distributed servers to deliver content to end user devices 110. Each server may function as a point of presence (POP) 125, e.g., POP 125*a* and POP 125*b*. The CDN POP 125 may cache and deliver content to end user devices 110. A CDN 120 may be chosen by the content provider or dynamically assigned for best performance. It should be noted that although this disclosure describes two POPs 125 in FIG. 1, any suitable number (e.g., more than two) of POPs can be implemented in a CDN. Upon receiving the request from the end user device 110, the CDN 120 may try to fulfill from the cache. On a cache miss, the CDN 120 may forward the request upstream to the mid-tier video transformer 130 for logic-driven routing.

The mid-tier video transformer 130 may be the layer where logic resides to determine fragment type, apply URL transformations for VOD, collapse live segment requests, and route to the correct origin. Upon receiving the request from the CDN 120, the mid-tier video transformer 130 may decide the correct origin server 140 based on fragment type and rules and then request the content from that origin server 140. Examples of operations by the mid-tier video transformer 130 are described herein with references to FIG. 2, FIG. 3, and FIGS. 4A-4B.

The origin server 140 represents a source of the content (e.g., video segments, advertisements, etc.). The origin server 140 may store the master copies of all content.

The content (e.g., video fragment) retrieved from the origin server 140 may be returned to the mid-tier video transformer 130. The mid-tier video transformer 130 may cache or transform the retrieved content. The mid-tier video transformer 130 may send the retrieved content to the CDN 120. The CDN 120 may cache the content. The CDN 120 may send the final video fragment via a POP 125 to the end user device 110.

In particular embodiments, the mid-tier video transformer 130 may use a microservices architecture for scalability. For example, containers can be used for each service and orchestrated with an open-source system that automates the management, deployment, and scaling of containerized applications. The mid-tier video transformer 130 may be built on top of a cloud provider for flexibility and scalability, utilizing load balancers to handle traffic spikes. The mid-tier video transformer may use programming languages suited for network-heavy applications with a focus on handling HTTP requests efficiently.

FIG. 2 illustrates the system components of the mid-tier video transformer 130, according to at least one embodiment. The mid-tier video transformer 130 may include a request ingress layer 205. In particular embodiments, the request ingress layer 205 may be a reverse proxy, which may implemented using a high-performance proxy server. The request ingress layer 205 may be the initial entry point for all traffic from CDNs 120. The request ingress layer 205 may route incoming HTTP/HTTPS requests to the appropriate internal services. The request ingress layer 205 may handle initial load balancing, secure socket layer (SSL) termination, request filtering, etc.

The mid-tier video transformer 130 may include a configuration-and-rules engine 210. The configuration-and-rules engine 210 may centralize and manage the logic for request transformations and routing decisions. The configuration-and-rules engine 210 may store rules for identifying content types (e.g., main video, advertisement fragment, pre-roll content, or post-roll content) based on URL patterns and query parameters. The configuration-and-rules engine 210 may allow operators to dynamically update logic without touching CDN configurations. The configuration-and-rules engine 210 may provide an application programming interface (API) or user interface (UI) for real-time rule changes, enabling rapid adaptation to new CDN partners or content types. The configuration-and-rules engine 210 may allow streaming providers to configure URL transformation rules for different content types easily. For example, the configuration-and-rules engine 210 may enable streaming providers to create a configuration file (e.g., YAML) that allows the provider to specify which CDN fragments should map to specific origin servers.

The mid-tier video transformer 130 may include a URL transformation service 215, which may interpret and/or modify requests for VOD content to route them to the correct origin server 140. The URL transformation service 215 may use the rules from the configuration-and-rules engine 210 to parse incoming VOD requests and determine the correct origin server 140. The URL transformation service 215 may transform URLs, append or remove query parameters, and reconstruct request paths to point to advertisement servers, main video servers, or other specialized content endpoints. The URL transformation service 215 may ensure consistent and correct routing logic independent of which CDN 120 sent the request.

The mid-tier video transformer 130 may include a live media shield 220 (e.g., a fragment aggregator). The live media shield 220 may optimize live streaming requests by collapsing multiple simultaneous requests for the latest segment into one request. The live media shield 220 may listen for concurrent requests to the same live fragment and merge them to reduce the load on the origin server 140. The live media shield 220 may maintain a short-term cache of the most recent live media segments. Once the segment is fetched, it can be immediately available to one or more requesting CDNs 120, reducing latency and bandwidth usage.

The mid-tier video transformer 130 may include a caching layer 225, which speeds up content retrieval and reduces redundant requests to origin servers 140. In particular embodiments, the caching layer 225 may use an in-memory store (e.g., a fast, open-source, in-memory key-value data structure store) to cache frequently accessed fragments, which can be particularly useful for live streaming. The caching layer 225 may decrease the load on origin servers 140, improve response times, and enhance scalability. In some embodiments, the caching layer 225 may integrate with the live media shield 220 to serve cached fragments quickly.

The mid-tier video transformer 130 may include a routing-and-origin-abstraction layer 230, which directs transformed requests to the correct origin servers 140. The routing-and-origin-abstraction layer 230 may maintain mappings of various content types to their respective origin servers 140 (e.g., main video server, advertisement server, or specialized animation source). The routing-and-origin-abstraction layer 230 may use dynamic service discovery or configuration files to determine where to send requests. The routing-and-origin-abstraction layer 230 can decouple the CDNs 120 from accessing any details about the actual origin server 140.

The mid-tier video transformer 130 may include one or more observability-and-monitoring components 235, which provide visibility into system health, performance, and traffic patterns. The observability-and-monitoring components 235 may provide logging services that record every request processed, including transformation decisions and caching results. The observability-and-monitoring components 235 may perform metrics collection that tracks request rates, latency, error rates, and cache hit ratios. The observability-and-monitoring components 235 may provide dashboard tools that offer real-time insights to operators for troubleshooting, capacity planning, and performance tuning.

The mid-tier video transformer 130 may include security-and-access-control mechanisms 240, which ensure that only authorized CDNs 120 or known clients can use the service. The security-and-access-control mechanisms 240 may implement transport layer security (TLS) for encrypted communication. The security-and-access-control mechanisms 240 may support authentication and authorization checks (e.g., API keys, client certificates, etc.), enforce rate limits, and request validation to prevent abuse.

The mid-tier video transformer 130 may include a management-and-control plane 245, which provides interfaces and APIs for administrators to configure, update, and/or scale the system. The management-and-control plane 245 may include a web-based portal or command-line tools for changing rules, updating origin servers 140, and/or adding new CDN endpoints. The management-and-control plane 245 may offer integration hooks for continuous integration (CI)/continuous delivery (CD) pipelines, enabling automated updates to rules and logic as streaming services evolve.

The mid-tier video transformer 130 may include a common API layer 250 for cross-CDN compatibility. One or more CDNs may interact with the common API layer 250 when making video fragment requests. The common API layer 250 can ensure that regardless of the CDN, the same API is used to transform and route the requests. The common API layer 250 may implement a versioning system (e.g., /v1, /v2) to support different versions of CDN requests as they evolve. When onboarding a new CDN, the mid-tier video transformer 130 may register its requests with the common API layer 250 without the need for custom logic specific to that CDN. All transformation logic may remain centralized in the mid-tier video transformer 130, allowing seamless integration with new CDNs.

The mid-tier video transformer 130 may include different logics 260 used to perform the functionalities disclosed herein. The logics 260 can be categorized into content-type determination logic, URL transformation logic, live fragment collapsing logic for media shield functionality, routing logic, caching logic, configuration-and-rules update logic, observability-and-metric collection logic, and security and compliance logic.

The content-type determination logic may identify what type of media fragment is being requested based on pattern matching. The mid-tier video transformer 130 may parse incoming fragment requests to identify their types (e.g., main content, ad, pre-roll, post-roll). In particular embodiments, the mid-tier video transformer 130 may inspect the request URL and associated query parameters. For example, a request may contain a parameter like fragment_type=advertisement or have a path segment like /adSegments/. The content-type determination logic may be associated with one or more configuration rules stored in a configurable rule file (e.g., in YAML or JSON). The configuration rules may define patterns for different content types. For instance, "/live/" in the URL path indicates live video fragment; "?type=ad" in the query parameter indicates advertisement fragment; and absence of any of these example patterns indicates main video content. Once the appropriate pattern is matched, the mid-tier video transformer 130 tags the request as live, advertisement, pre-roll, post-roll, or main, etc.

The URL transformation logic may rewrite incoming URLs so that they point to the correct origin server 140 depending on the fragment type using rule-based redirection. For example, the configuration-and-rules engine 210 may hold instructions as follows. For advertisement fragments: append "/ads" to the URL and route to ad.example.com. For pre-roll fragments: rewrite URL to "/preroll/ . . . " and route to assets.example.com/pre-roll/. For main content: leave the URL mostly as-is or perform minor rewrites to standardize fragment names before forwarding to video-origin.example.com. The URL transformation logic may perform chained transformations, where multiple steps may be applied. For example, in a first step, the mid-tier transformer may normalize the requested fragment name (e.g., removing trailing indices or add standardized file extensions). In a second step, the mid-tier video transformer 130 may insert dynamic query parameters to improve caching or debugging (e.g., ?origin=video&version=2). The outcome of the URL transformation logic may be that the request leaving the mid-tier video transformer 130 is often different than what arrived, ensuring the correct fragment is fetched from the right origin server 140.

The live fragment collapsing logic for media shield functionality may reduce load of origin servers 140 by collapsing multiple simultaneous requests for the same live fragment into one request based on fragment tracking. The mid-tier video transformer 130 may maintain an in-memory map keyed by fragment identifier (e.g., currentSegment-<timestamp>). When a new request arrives, the mid-tier video transformer 130 may check if the fragment is already being fetched. The live fragment collapsing logic may be associated with a queueing mechanism. If the fragment is currently in the process of retrieval, the mid-tier video transformer 130 may not forward another request to the origin server 140. Instead, the mid-tier video transformer 130 may put the incoming request on hold (queuing it) until the first request completes. The live fragment collapsing logic may have cache utilization. Once the origin server's 140 response returns, the fragment is stored in the cache, and all queued requests are immediately served from the cache. The live fragment collapsing logic may comprise a timing logic. The live fragment collapsing logic may determine how long to wait before a fragment is considered stale and must be re-fetched. For instance, if a live stream fragment is expected every 2 seconds, after a short time-to-live (TTL), the logic will fetch a fresh fragment.

The routing logic may direct requests to the appropriate origin server 140 based on origin mapping rules. The mid-tier video transformer 130 may keep a lookup table that maps fragment types or transformed URLs to specific origin servers 140, e.g., advertisement segments to ad-origin.example.com, pre-roll segments to pre-roll-origin.example-.com, main video fragments to video-origin.example.com. The routing logic may have load balancing considerations. If there are multiple servers behind each origin, the routing logic may distribute requests evenly or according to configurable load balancing strategies (e.g., round-robin, least-connections). The routing logic may have fallbacks and failover. If the primary origin server 140 is down, the routing logic rules may dictate trying a secondary origin server 140. This fallback routing is defined in the configuration. For example, if video-origin.example.com is unavailable, the mid-tier video transformer 130 may reroute requests to a backup origin server 140.

The caching logic may improve performance and reduce redundant requests to origin servers 140 based on cache keys. The caching logic may define how cache keys are generated. For example, the key may be the final transformed URL plus a fragment timestamp. The caching logic may have expiration and invalidation rules, where the caching logic may set TTL values for different fragment types. Live segments may only be valid for a few seconds, while certain VOD fragments may be cached longer. When a TTL expires, the caching logic may fetch a fresh fragment from the origin server 140. The caching logic may be stale-while-revalidate. In some scenarios, the caching logic may serve a cached fragment while asynchronously fetching an updated fragment in the background, which ensures continuous service with minimal interruption.

The configuration-and-rules update logic may allow rapid changes to transformation, routing, and caching without code redeployments based on dynamic reloading. The mid-tier video transformer 130 may periodically check for changes in the configuration files or listens for signals to reload them. The configuration-and-rules update logic may have versioned rules, where multiple versions of rules can coexist. The configuration-and-rules update logic may determine which version applies based on request headers or feature flags. Before applying new rules, the configuration-and-rules update logic can run a validation check to ensure there are no malformed patterns or conflicting routes. If validation fails, the configuration-and-rules update logic may fall back to the last known good configuration.

The observability-and-metric collection logic may enable transparent monitoring, debugging, and optimization based on request logging. Every request passing through may be logged, along with which logic branches were applied. This may include which pattern matched the fragment type, which URL transformation was performed, and which origin server 140 was chosen. The observability-and-metric collection logic may feed metrics (e.g., fragment request rate, cache hit/miss, transformation latency) into monitoring tools. If certain thresholds are exceeded (like too many cache misses or slow responses), an alert may be raised. The observability-and-metric collection logic may have debug headers. The mid-tier video transformer 130 can inject debugging headers into the response (e.g., X-Transformed-By or X-Fragment-Type) so operators can quickly identify how the logic processed a particular request.

The security and compliance logic may ensure that only authorized CDNs 120 and clients can access the service and that sensitive logic is not exposed based on authentication checks. The security and compliance logic may verify API keys or tokens provided by the CDN 120. If invalid, the security and compliance logic may reject the request before any transformation occurs. The security and compliance logic may have rate limiting and throttling. If a CDN 120 sends too many requests, the security and compliance logic may slow them down or block them altogether, ensuring fair use and preventing abuse. The security and compliance logic may have compliance filters. Certain rules may ensure content is only served to authorized regions or meets other policy guidelines. The security and compliance logic may check geo-IP data or request headers and may rewrite or reject requests that do not comply.

An end-to-end logic execution example is described below. A CDN 120 may make a request. For example, the request may be in the format of GET https://transformer.example.com/live/channel123/segment456.m4s. The logic 260 may then check the URL pattern and identify that the requested video content is a live segment (e.g., based on /live/). The live fragment collapsing logic may check if segment456 is already being fetched. If not, the mid-tier video transformer 130 may initiate a fetch from video-origin.example.com. Once retrieved, the mid-tier video transformer 130 may cache the segment. If subsequent requests arrive for the same segment, they may be immediately served from cache. The request may be logged with details: fragmentType=live, cacheMissOnFirstAttempt= true, route=video-origin.example.com. The response may include headers showing it was transformed and possibly a debug header indicating the applied rules. For VOD, a request like GET https://transformer.example.com/vod/showXYZ/segment010.m4s?type=ad may trigger the URL transformation logic to route it to the advertisement origin server 140. The response and logs may reflect these transformations.

Figure 3:
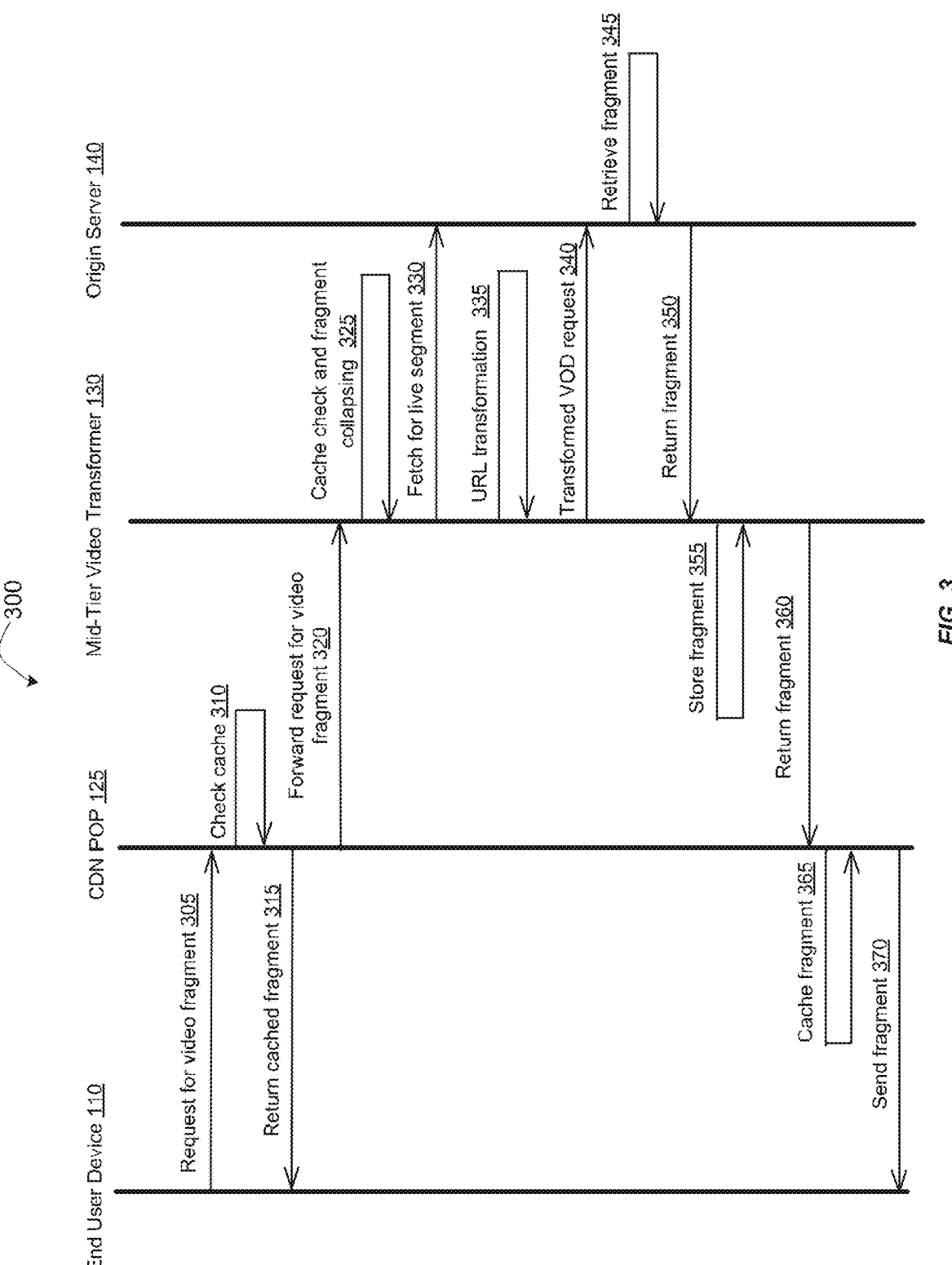
FIG. 3 illustrates a sequence flow for centralized video transformation for CDNS, according to at least one embodiment.

FIG. 3 illustrates a sequence flow 300 for centralized video transformation for CDNS, according to at least one embodiment. The sequence flow 300 may be between an end user device 110, a CDN point of presence (POP) 125, the mid-tier video transformer 130, and the origin server 140.

In an example scenario, an end user is watching a video stream or playback session on their end user device 110 (e.g., a smartphone, tablet, or smart TV). The user's video player may request a specific video fragment (for live or VOD content). As an example and not by way of limitation, the request may involve an HTTP GET request, such as GET https://cdn.example.com/video/channelX/segmentY.m4s. The player of the end user device may use adaptive streaming protocols like HTTP Live Streaming (HLS) or Dynamic Adaptive Streaming over HTTP (DASH), which periodically requests segments based on manifest files. At this point, e.g., operation 305 illustrated in FIG. 3, the request may leave the end user device 110 and travel over the internet to the assigned CDN POP 125 closest to the geographic location of the end user device 110.

The request arrives at the CDN POP 125, which may then check if it has the requested fragment in its local cache at operation 310. If cached, the CDN 120 may quickly return the fragment to the end user device 110 at operation 315, completing the request without going further upstream. If not cached (e.g., the requested segment is fresh, uncommon, or not present in the cache), the CDN 120 may fetch the fragment from its defined upstream server. When a cache miss occurs, the CDN 120 may forward the request, e.g., in the form of GET https://transformer.example.com/video/channelX/segmentY.m4s, to the mid-tier video transformer 130 at operation 320. At this point, the CDN 120 may act as a client, making a request to an API endpoint of the mid-tier video transformer 130. The mid-tier video transformer 130 may have multiple API endpoints that accept requests from the CDN 120 (e.g., /getLiveFragment) and manage the logic to collapse repeated requests.

Upon receiving the request from the CDN 120, the mid-tier video transformer 130 may identify the request type. In particular embodiments, the mid-tier video transformer 130 may examine the URL and parameters. If the mid-tier video transformer 130 identifies video/channelX/segmentY.m4s and recognizes a live pattern (e.g., channelX is a known live channel), the mid-tier video transformer 130 may invoke the live media shield logic. If the request indicates VOD with certain query parameters (e.g., type=ad or a special path structure), the mid-tier video transformer 130 may apply URL transformation logic.

The mid-tier video transformer 130 may perform cache check and fragment collapsing at operation 325 (e.g., for live streams). If the requested fragment is a live segment, the mid-tier video transformer 130 may check if another identical fragment request is currently being processed. If yes, the mid-tier video transformer 130 may wait for the processing of the identical fragment request to complete rather than fetching again. If no request is in progress for that segment, the mid-tier video transformer may trigger a new fetch 330 from the appropriate origin server 140. The mid-tier video transformer 130 may use its own caching layer. For instance, if the mid-tier video transformer 130 just fetched this live segment milliseconds ago, it can return the fetched live segment immediately without going to the origin server 140.

The mid-tier video transformer 130 may perform URL transformation (for VOD) at operation 335. If the requested fragment is a VOD segment, the mid-tier video transformer 130 may use configuration rules to determine if the request is for a main video fragment, ad fragment, or special content like pre-roll. The mid-tier video transformer 130 may then rewrite the URL and decide which origin server 140 to contact. For example, if the mid-tier video transformer 130 identifies an advertisement segment, it may rewrite . . . /segmentY.m4s?type=ad into ad.example.com/vod/ads/segmentY-ad.m4s.

The mid-tier video transformer 130 may make routing decision. Based on the identified fragment type and rules, the mid-tier video transformer 130 may select an endpoint of the correct origin server 140. For example, the endpoint for main video fragments may be video-origin.example.com; the endpoint for advertisement fragments may be ad-origin.example.com; and the endpoint for pre-roll segments may be assets-origin.example.com/pre-roll/.

The mid-tier video transformer 130 may then forward the request to the origin server 140 at operation 340. In particular embodiments, the mid-tier video transformer 130 may issue a request upstream to the chosen origin server 140. For example, the issued request may be in the form of GET https://video-origin. example.com/channelX/segmentY.m4s or GET https://ad-origin.example.com/vod/ads/segmentY-ad.m4s.

As described above, the mid-tier video transformer 130 can function as an orchestration point, ensuring that the CDN 120 no longer needs complex logic. The mid-tier video transformer 130 may centralize decision-making, reducing complexity and speeding up feature deployment.

The origin server 140 may receive the request 340 from the mid-tier video transformer 130. For example, the request 340 may be a standard HTTP GET request for a specific file or video segment. The origin server 140 may then retrieve the requested fragment from its storage (e.g., a storage bucket, file system, or dedicated media server) at operation 345. The origin server 140 may then return the video fragment to the mid-tier video transformer 130 in the HTTP response at operation 350. The origin server 140 may be not involved in logic or transformations. The origin server 140 may merely provide the requested segment. The mid-tier video transformer 130 may abstract the complexity so that the origin server 140 remains a straightforward content repository.

After obtaining the fragment from the origin server 140, the mid-tier video transformer 130 may store the fragment in its cache (particularly for live segments) if appropriate at operation 355. The mid-tier video transformer 130 may then return the fragment back to the CDN 120, e.g., to the CDN POP 125, at operation 360. The mid-tier video transformer 130 may set time-to-live (TTL) rules for fragments to avoid serving stale content. The CDN 120 may receive the now-available fragment. The CDN 120 may cache this fragment locally at operation 365. This way, subsequent user requests for the same fragment can be fulfilled directly from the CDN 120, improving response times. The CDN 120 may send the fragment to the end user device 110 at operation 370.

The player on the end user device 110 may receive the fragment and continue the playback. If the fragment is associated with live stream, the player may request the next segment shortly after. If the fragment is associated with VOD, the player may continue until the next segment is needed.

The cycle as illustrated in FIG. 3 may repeat as the user watches more segments or seeks through the video.

In particular embodiments, the mid-tier video transformer 130 may conduct comprehensive logging using various tools to track each request, fragment type, and/or routing decision. The mid-tier video transformer 130 may provision a monitoring dashboard to monitor traffic flow, fragment request patterns, and/or cache performance.

In particular embodiments, the mid-tier video transformer 130 may utilize robust error handling mechanisms to detect and recover from issues like failed origin server requests or CDN connection timeouts. The mid-tier video transformer 130 may use fallback strategies in case of service failures (e.g., serving from a backup CDN 120 or using cached fragments).

Figure 4A:
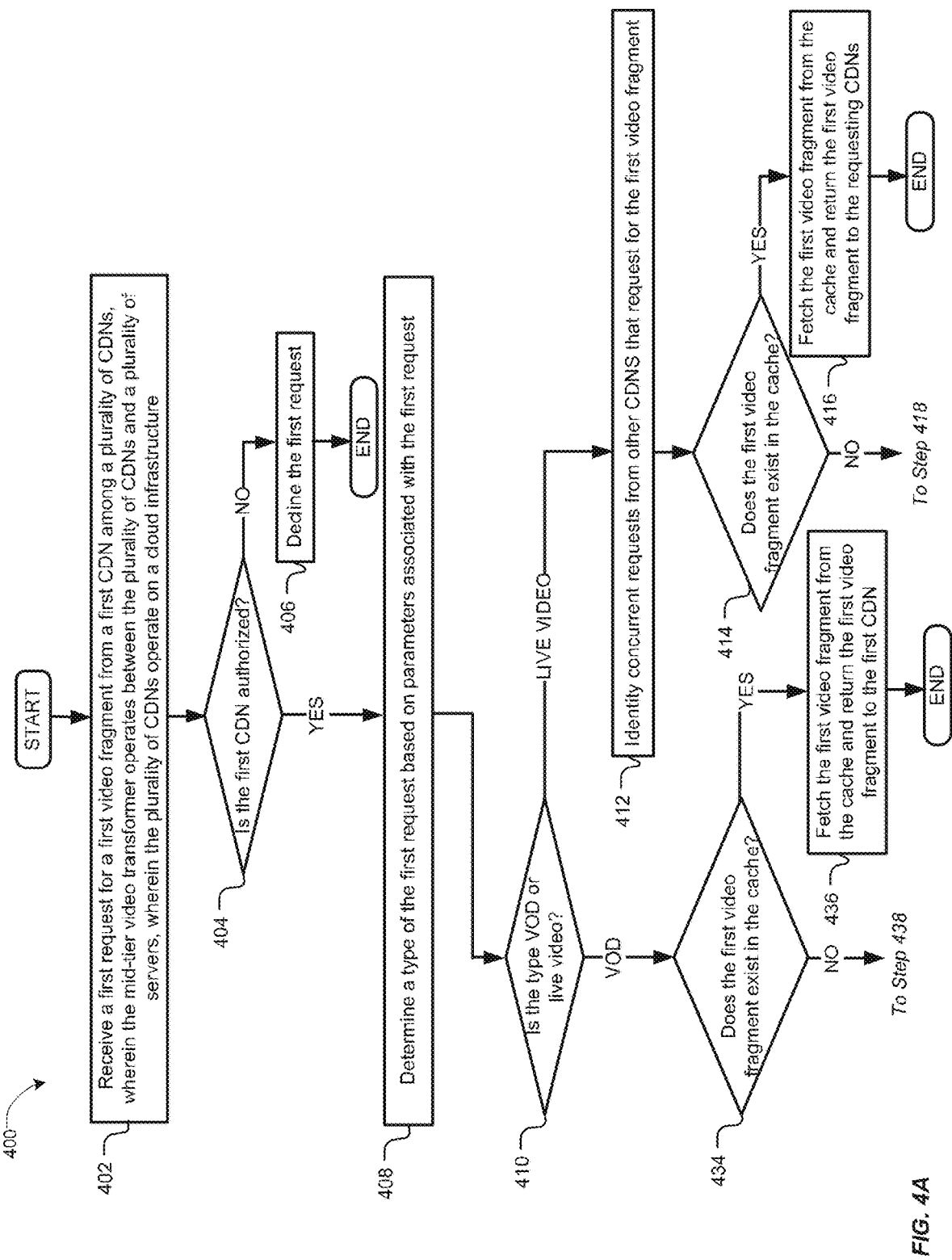

FIGS. 4A-4B illustrate a method 400 for video transformation for CDNs, according to at least one embodiment. Method 400 may begin at step 402, where the mid-tier video transformer (e.g., mid-tier video transformer 130 of FIGS. 1 and 2) may receive a first request for a first video fragment from a first CDN 120 among a plurality of CDNs 120. The mid-tier video transformer 130 operates between the plurality of CDNs 120 and a plurality of servers 140. In particular embodiments, the plurality of CDNs 120 may operate on a cloud infrastructure.

At step 404, the mid-tier video transformer 130 may determine whether the first CDN 120 is authorized to use functions provisioned by the mid-tier video transformer 130 based on security-and-access-control mechanisms 240. In particular embodiments, determining whether the first CDN 120 is authorized may include determining whether the first CDN 120 has submitted multiple requests and/or whether the request rate of these requests exceeds a rate limit.

If the first CDN 120 is not authorized (e.g., determined based security-and-access-control mechanisms 240 or the request rate exceeding the rate limit), the mid-tier video transformer 130 may decline the first request at step 406. In particular embodiments, decline the first request may include suspending the first request for a period of time.

In particular embodiments, for the scenario where the first CDN 120 has submitted multiple requests with a request rate exceeding the rate limit, determining whether the first CDN 120 is authorized may additionally include requesting validations for the multiple requests from the first CDN 120. If the first CND 120 provides validations, the mid-tier video transformer 130 may determine that the first CDN 120 is authorized. Otherwise, the mid-tier video transformer 130 may determine that the first CDN 120 is not authorized.

If the first CDN 120 is authorized, the mid-tier video transformer 130 may determine a type of the first request based on parameters associated with the first request at step 408.

At decision point 410, the mid-tier video transformer 130 may determine whether the type is VOD or live video. The decision may result in separate flows. If the type is live video, method 400 may proceed to a flow for the function of live video media shield, including step 412 to step 432.

At step 412, the mid-tier video transformer 130 may identity concurrent requests from other CDNS 120 that request for the first video fragment.

At step 414, the mid-tier video transformer 130 may determine whether the first video fragment exist in the cache of the mid-tier video transformer 130 by searching the cache. The cache may be configured to store recent video fragments.

If the first video fragment exists in the cache, the mid-tier video transformer 130 may fetch the first video fragment from the cache and return the first video fragment to all the requesting CDNs 120 including the first CDN 120 at step 416. Method 400 may then end.

If the first video fragment does not exist in the cache, the mid-tier video transformer 130 may identify, based on the type of the concurrent requests, second configuration rules to transform the concurrent requests at step 418.

At step 420, the mid-tier video transformer 130 may determine, based on the second configuration rules and patterns associated with the URLs in the concurrent requests, a first media type associated with the first video fragment.

At step 422, the mid-tier video transformer 130 may identify, based on the first media type of the first video fragment, load balancing, and performance evaluation, the first server 140.

At step 424, the mid-tier video transformer 130 may generate transformed requests for the concurrent requests based on one or more of normalizing a name of the first video fragment, transforming the URLs, appending a parameter, removing a parameter, or reconstructing a request path to point to the first server, wherein the transformed request specifies the first video fragment and a first server endpoint of the first server 140.

At step 426, the mid-tier video transformer 130 may merge the concurrent requests into a single request.

At step 428, the mid-tier video transformer 130 may route the single request to the first server 140.

At step 430, the mid-tier video transformer 130 may receive the first video fragment from the first server 140.

At step 432, the mid-tier video transformer 130 may transmit the first video fragment to all the requesting CDNs 120. Method 400 may then end.

If the type is VOD, method 400 may proceed to a flow for the function of video on demand, including step 434 to step 450.

At step 434, the mid-tier video transformer 130 may determine whether the first video fragment exist in the cache of the mid-tier video transformer 130 by searching the cache.

If the first video fragment exists in the cache, the mid-tier video transformer 130 may fetch the first video fragment from the cache and return the first video fragment to the first CDN 120 at step 436. Method 400 may then end.

If the first video fragment does not exist in the cache, the flow may proceed to step 438. At step 438, the mid-tier video transformer 130 may identify, based on the type of the first request, first configuration rules among a plurality of configuration rules to transform the first request. The plurality of configuration rules may be centralized in the mid-tier video transformer 130, generic to the plurality of CDNs 120, and decoupled from each of the plurality of CDNs 120.

At step 440, the mid-tier video transformer 130 may determine, based on the first configuration rules and a pattern associated with the URL in the first request, a first media type associated with the first video fragment. For example, the first media type may be advertisements, pre-roll content, or post-roll content.

At step 442, the mid-tier video transformer 130 may identify, based on the first media type of the first video fragment, load balancing, and performance evaluation, a first server 140 from the plurality of servers 140. In particular embodiments, identifying the first server 140 based on the load balancing may be as follows. Among the plurality of servers, one or more second servers 140 may store the first media type of video fragments. The mid-tier video transformer 130 may determine the load balancing between the first server 140 and the one or more second servers 140. The mid-tier video transformer 130 may identity the first server 140 because the load balancing indicates it is optimal to select the first server 140 for fetching the first video fragment to balance the load distribution between among the first and second servers 140. In particular embodiments, identifying the first server 140 based on the performance evaluation may be as follows. The mid-tier video transformer 130 may determine that the performance of the first server 140 is sufficient for efficiently returning the first video fragment. However, if the performance of the first server 140 is not sufficient (e.g., failure) for efficiently returning the first video fragment, the mid-tier video transformer 130 may select one of the one or more second servers 140 instead. For example, the failure of the first server 140 may include the first server 140 experiencing a slowdown due to a high CPU/memory utilization or a network issue.

At step 444, the mid-tier video transformer 130 may generate a transformed request for the first request based on one or more of normalizing a name of the first video fragment, transforming the URL, appending a parameter, removing a parameter, or reconstructing a request path to point to the first server 140. In particular embodiments, the transformed request may specify the first video fragment and a first server endpoint of the first server 140.

At step 446, the mid-tier video transformer 130 may route the transformed request to the first server 140.

At step 448, the mid-tier video transformer 130 may receive the first video fragment from the first server 140.

At step 450, the mid-tier video transformer 130 may transmit the first video fragment to the first CDN 120.

Method 400 may then end.

Particular embodiments may repeat one or more steps of the method of FIGS. 4A-4B, where appropriate. Although this disclosure describes and illustrates particular steps of the method of FIGS. 4A-4B as occurring in a particular order, this disclosure contemplates any suitable steps of the method of FIGS. 4A-4B occurring in any suitable order. Moreover, although this disclosure describes and illustrates an example method for video transformation for CDNs including the particular steps of the method of FIGS. 4A-4B, this disclosure contemplates any suitable method for video transformation for CDNs including any suitable steps, which may include all, some, or none of the steps of the method of FIGS. 4A-4B, where appropriate. Furthermore, although this disclosure describes and illustrates particular components, devices, or systems carrying out particular steps of the method of FIGS. 4A-4B, this disclosure contemplates any suitable combination of any suitable components, devices, or systems carrying out any suitable steps of the method of FIGS. 4A-4B.

The embodiments disclosed herein can be utilized in infrastructure as a service (IaaS). IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 5:
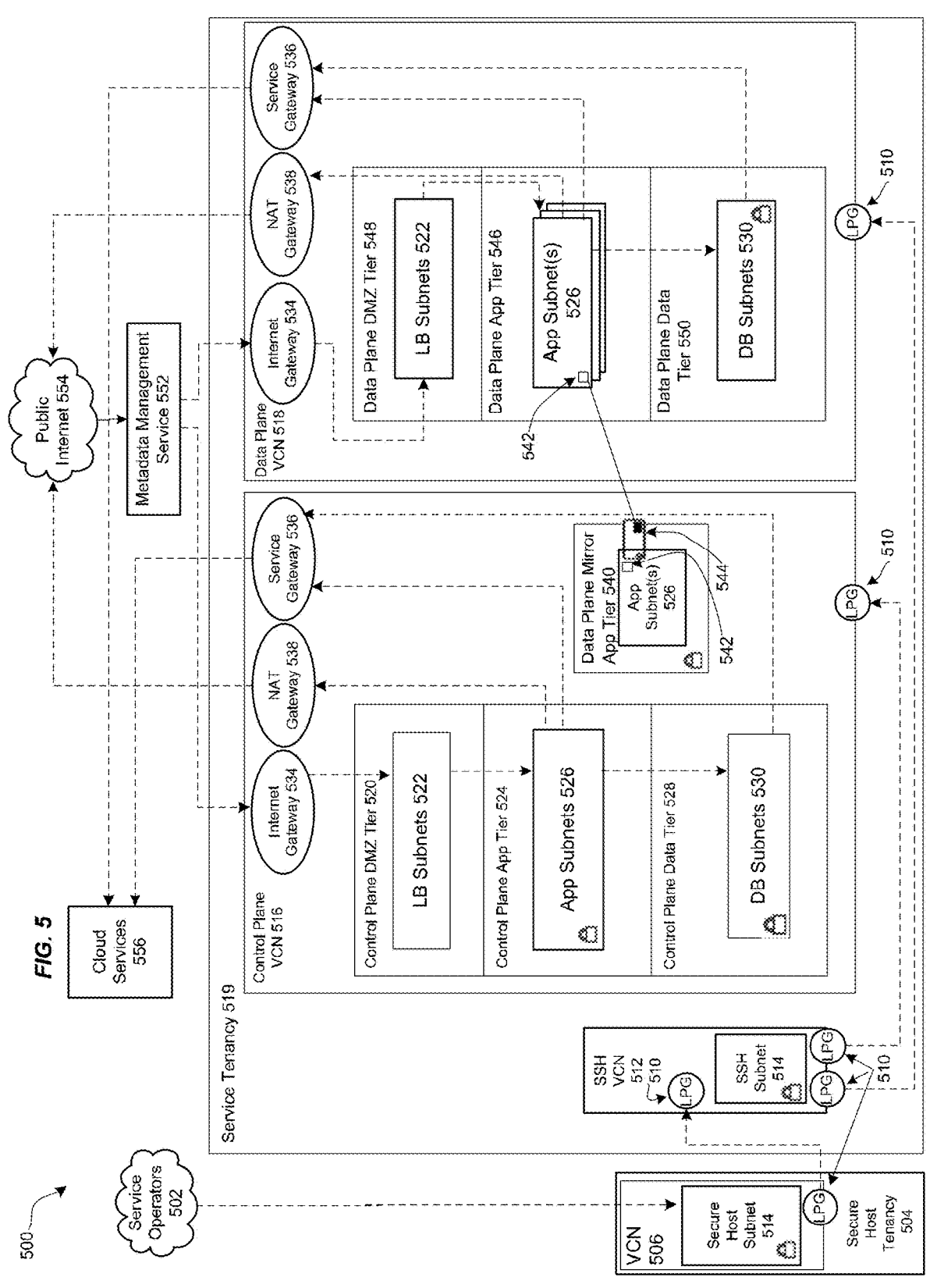
FIG. 5 is a block diagram illustrating an example pattern of an IaaS architecture, according to at least one embodiment.

FIG. 5 is a block diagram 500 illustrating an example pattern of an IaaS architecture, according to at least one embodiment. Service operators 502 can be communicatively coupled to a secure host tenancy 504 that can include a virtual cloud network (VCN) 506 and a secure host subnet 508. In some examples, the service operators 502 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 506 and/or the Internet.

The VCN 506 can include a local peering gateway (LPG) 510 that can be communicatively coupled to a secure shell (SSH) VCN 512 via an LPG 510 contained in the SSH VCN 512. The SSH VCN 512 can include an SSH subnet 514, and the SSH VCN 512 can be communicatively coupled to a control plane VCN 516 via the LPG 510 contained in the control plane VCN 516. Also, the SSH VCN 512 can be communicatively coupled to a data plane VCN 518 via an LPG 510. The control plane VCN 516 and the data plane VCN 518 can be contained in a service tenancy 519 that can be owned and/or operated by the IaaS provider.

The control plane VCN 516 can include a control plane demilitarized zone (DMZ) tier 520 that acts as a perimeter network (e.g., portions of a corporate network between the corporate intranet and external networks). The DMZ-based servers may have restricted responsibilities and help keep breaches contained. Additionally, the DMZ tier 520 can include one or more load balancer (LB) subnet(s) 522, a control plane app tier 524 that can include app subnet(s) 526, a control plane data tier 528 that can include database (DB) subnet(s) 530 (e.g., frontend DB subnet(s) and/or backend DB subnet(s)). The LB subnet(s) 522 contained in the control plane DMZ tier 520 can be communicatively coupled to the app subnet(s) 526 contained in the control plane app tier 524 and an Internet gateway 534 that can be contained in the control plane VCN 516, and the app subnet(s) 526 can be communicatively coupled to the DB subnet(s) 530 contained in the control plane data tier 528 and a service gateway 536 and a network address translation (NAT) gateway 538. The control plane VCN 516 can include the service gateway 536 and the NAT gateway 538.

The control plane VCN 516 can include a data plane mirror app tier 540 that can include app subnet(s) 526. The app subnet(s) 526 contained in the data plane mirror app tier 540 can include a virtual network interface controller (VNIC) 542 that can execute a compute instance 544. The compute instance 544 can communicatively couple the app subnet(s) 526 of the data plane mirror app tier 540 to app subnet(s) 526 that can be contained in a data plane app tier 546.

The data plane VCN 518 can include the data plane app tier 546, a data plane DMZ tier 548, and a data plane data tier 550. The data plane DMZ tier 548 can include LB subnet(s) 522 that can be communicatively coupled to the app subnet(s) 526 of the data plane app tier 546 and the Internet gateway 534 of the data plane VCN 518. The app subnet(s) 526 can be communicatively coupled to the service gateway 536 of the data plane VCN 518 and the NAT gateway 538 of the data plane VCN 518. The data plane data tier 550 can also include the DB subnet(s) 530 that can be communicatively coupled to the app subnet(s) 526 of the data plane app tier 546.

The Internet gateway 534 of the control plane VCN 516 and of the data plane VCN 518 can be communicatively coupled to a metadata management service 552 that can be communicatively coupled to public Internet 554. Public Internet 554 can be communicatively coupled to the NAT gateway 538 of the control plane VCN 516 and of the data plane VCN 518. The service gateway 536 of the control plane VCN 516 and of the data plane VCN 518 can be communicatively couple to cloud services 556.

In some examples, the service gateway 536 of the control plane VCN 516 or of the data plane VCN 518 can make application programming interface (API) calls to cloud services 556 without going through public Internet 554. The API calls to cloud services 556 from the service gateway 536 can be one-way: the service gateway 536 can make API calls to cloud services 556, and cloud services 556 can send requested data to the service gateway 536. But, cloud services 556 may not initiate API calls to the service gateway 536.

In some examples, the secure host tenancy 504 can be directly connected to the service tenancy 519, which may be otherwise isolated. The secure host subnet 508 can communicate with the SSH subnet 514 through an LPG 510 that may enable two-way communication over an otherwise isolated system. Connecting the secure host subnet 508 to the SSH subnet 514 may give the secure host subnet 508 access to other entities within the service tenancy 519.

The control plane VCN 516 may allow users of the service tenancy 519 to set up or otherwise provision desired resources. Desired resources provisioned in the control plane VCN 516 may be deployed or otherwise used in the data plane VCN 518. In some examples, the control plane VCN 516 can be isolated from the data plane VCN 518, and the data plane mirror app tier 540 of the control plane VCN 516 can communicate with the data plane app tier 546 of the data plane VCN 518 via VNICs 542 that can be contained in the data plane mirror app tier 540 and the data plane app tier 546.

In some examples, users of the system, or customers, can make requests, for example create, read, update, or delete (CRUD) operations, through public Internet 554 that can communicate the requests to the metadata management service 552. The metadata management service 552 can communicate the request to the control plane VCN 516 through the Internet gateway 534. The request can be received by the LB subnet(s) 522 contained in the control plane DMZ tier 520. The LB subnet(s) 522 may determine that the request is valid, and in response to this determination, the LB subnet(s) 522 can transmit the request to app subnet(s) 526 contained in the control plane app tier 524. If the request is validated and requires a call to public Internet 554, the call to public Internet 554 may be transmitted to the NAT gateway 538 that can make the call to public Internet 554. Metadata that may be desired to be stored by the request can be stored in the DB subnet(s) 530.

In some examples, the data plane mirror app tier 540 can facilitate direct communication between the control plane VCN 516 and the data plane VCN 518. For example, changes, updates, or other suitable modifications to configuration may be desired to be applied to the resources contained in the data plane VCN 518. Via a VNIC 542, the control plane VCN 516 can directly communicate with, and can thereby execute the changes, updates, or other suitable modifications to configuration to, resources contained in the data plane VCN 518.

In some embodiments, the control plane VCN 516 and the data plane VCN 518 can be contained in the service tenancy 519. In this case, the user, or the customer, of the system may not own or operate either the control plane VCN 516 or the data plane VCN 518. Instead, the IaaS provider may own or operate the control plane VCN 516 and the data plane VCN 518, both of which may be contained in the service tenancy 519. This embodiment can enable isolation of networks that may prevent users or customers from interacting with other users', or other customers', resources. Also, this embodiment may allow users or customers of the system to store databases privately without needing to rely on public Internet 554, which may not have a desired level of threat prevention, for storage.

In other embodiments, the LB subnet(s) 522 contained in the control plane VCN 516 can be configured to receive a signal from the service gateway 536. In this embodiment, the control plane VCN 516 and the data plane VCN 518 may be configured to be called by a customer of the IaaS provider without calling public Internet 554. Customers of the IaaS provider may desire this embodiment since database(s) that the customers use may be controlled by the IaaS provider and may be stored on the service tenancy 519, which may be isolated from public Internet 554.

Figure 6:
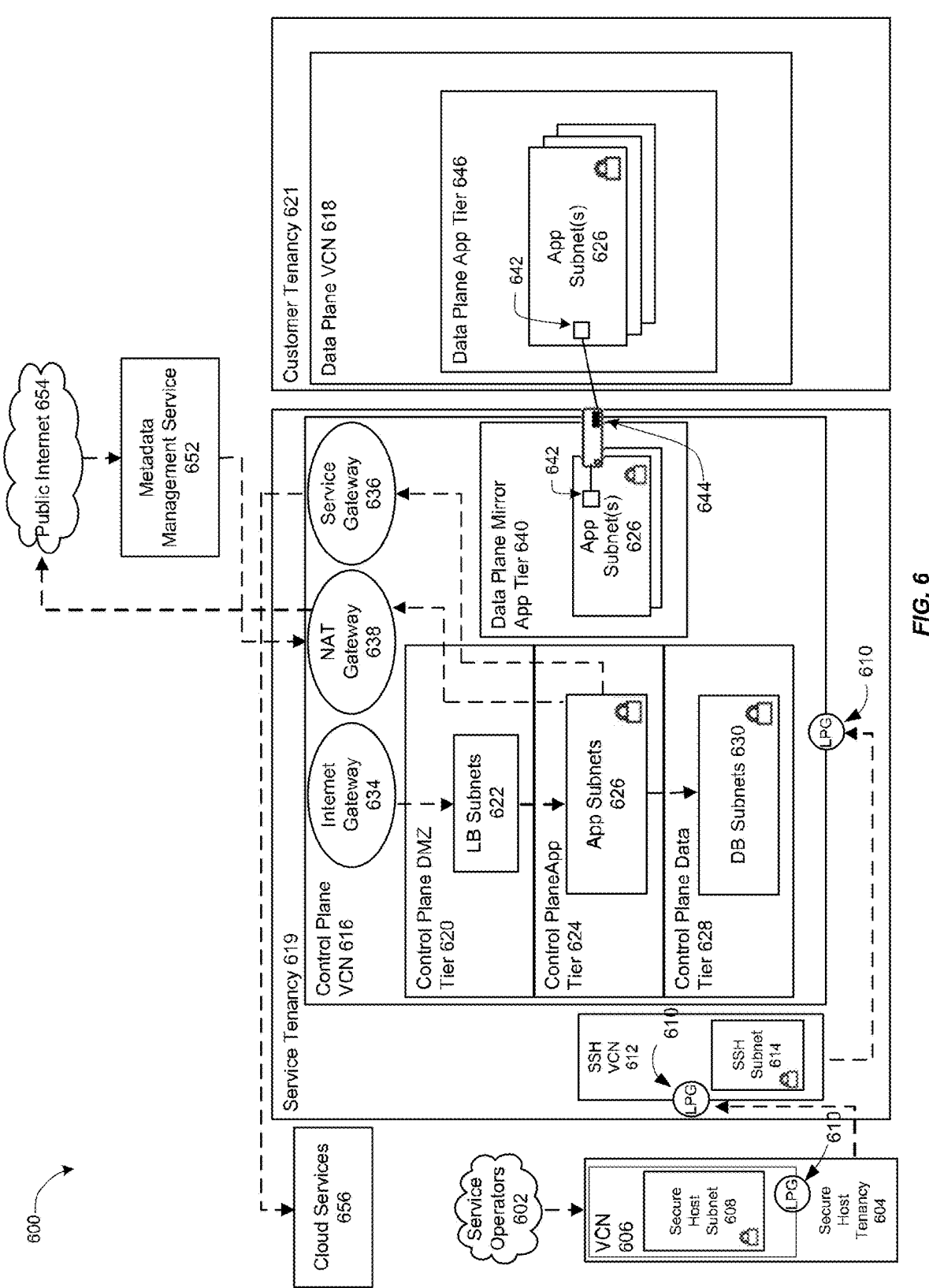
FIG. 6 is a block diagram illustrating another example pattern of an IaaS architecture, according to at least one embodiment.

FIG. 6 is a block diagram 600 illustrating another example pattern of an IaaS architecture, according to at least one embodiment. Service operators 602 (e.g., service operators 502 of FIG. 5) can be communicatively coupled to a secure host tenancy 604 (e.g., the secure host tenancy 504 of FIG. 5) that can include a virtual cloud network (VCN) 606 (e.g., the VCN 506 of FIG. 5) and a secure host subnet 608 (e.g., the secure host subnet 508 of FIG. 5). The VCN 606 can include a local peering gateway (LPG) 610 (e.g., the LPG 510 of FIG. 5) that can be communicatively coupled to a secure shell (SSH) VCN 612 (e.g., the SSH VCN 512 of FIG. 5) via an LPG 510 contained in the SSH VCN 612. The SSH VCN 612 can include an SSH subnet 614 (e.g., the SSH subnet 514 of FIG. 5), and the SSH VCN 612 can be communicatively coupled to a control plane VCN 616 (e.g., the control plane VCN 516 of FIG. 5) via an LPG 610 contained in the control plane VCN 616. The control plane VCN 616 can be contained in a service tenancy 619 (e.g., the service tenancy 519 of FIG. 5), and the data plane VCN 618 (e.g., the data plane VCN 518 of FIG. 5) can be contained in a customer tenancy 621 that may be owned or operated by users, or customers, of the system.

The control plane VCN 616 can include a control plane DMZ tier 620 (e.g., the control plane DMZ tier 520 of FIG. 5) that can include LB subnet(s) 622 (e.g., LB subnet(s) 522 of FIG. 5), a control plane app tier 624 (e.g., the control plane app tier 524 of FIG. 5) that can include app subnet(s) 626 (e.g., app subnet(s) 526 of FIG. 5), a control plane data tier 628 (e.g., the control plane data tier 528 of FIG. 5) that can include database (DB) subnet(s) 630 (e.g., similar to DB subnet(s) 530 of FIG. 5). The LB subnet(s) 622 contained in the control plane DMZ tier 620 can be communicatively coupled to the app subnet(s) 626 contained in the control plane app tier 624 and an Internet gateway 634 (e.g., the Internet gateway 534 of FIG. 5) that can be contained in the control plane VCN 616, and the app subnet(s) 626 can be communicatively coupled to the DB subnet(s) 630 contained in the control plane data tier 628 and a service gateway 636 (e.g., the service gateway 536 of FIG. 5) and a network address translation (NAT) gateway 638 (e.g., the NAT gateway 538 of FIG. 5). The control plane VCN 616 can include the service gateway 636 and the NAT gateway 638.

The control plane VCN 616 can include a data plane mirror app tier 640 (e.g., the data plane mirror app tier 540 of FIG. 5) that can include app subnet(s) 626. The app subnet(s) 626 contained in the data plane mirror app tier 640 can include a virtual network interface controller (VNIC) 642 (e.g., the VNIC of 542) that can execute a compute instance 644 (e.g., similar to the compute instance 544 of FIG. 5). The compute instance 644 can facilitate communication between the app subnet(s) 626 of the data plane mirror app tier 640 and the app subnet(s) 626 that can be contained in a data plane app tier 646 (e.g., the data plane app tier 546 of FIG. 5) via the VNIC 642 contained in the data plane mirror app tier 640 and the VNIC 642 contained in the data plane app tier 646.

The Internet gateway 634 contained in the control plane VCN 616 can be communicatively coupled to a metadata management service 652 (e.g., the metadata management service 552 of FIG. 5) that can be communicatively coupled to public Internet 654 (e.g., public Internet 554 of FIG. 5). Public Internet 654 can be communicatively coupled to the NAT gateway 638 contained in the control plane VCN 616. The service gateway 636 contained in the control plane VCN 616 can be communicatively couple to cloud services 656 (e.g., cloud services 556 of FIG. 5).

In some examples, the data plane VCN 618 can be contained in the customer tenancy 621. In this case, the IaaS provider may provide the control plane VCN 616 for each customer, and the IaaS provider may, for each customer, set up a unique compute instance 644 that is contained in the service tenancy 619. Each compute instance 644 may allow communication between the control plane VCN 616, contained in the service tenancy 619, and the data plane VCN 618 that is contained in the customer tenancy 621. The compute instance 644 may allow resources, that are provisioned in the control plane VCN 616 that is contained in the service tenancy 619, to be deployed or otherwise used in the data plane VCN 618 that is contained in the customer tenancy 621.

In other examples, the customer of the IaaS provider may have databases that live in the customer tenancy 621. In this example, the control plane VCN 616 can include the data plane mirror app tier 640 that can include app subnet(s) 626. The data plane mirror app tier 640 can reside in the data plane VCN 618, but the data plane mirror app tier 640 may not live in the data plane VCN 618. That is, the data plane mirror app tier 640 may have access to the customer tenancy 621, but the data plane mirror app tier 640 may not exist in the data plane VCN 618 or be owned or operated by the customer of the IaaS provider. The data plane mirror app tier 640 may be configured to make calls to the data plane VCN 618 but may not be configured to make calls to any entity contained in the control plane VCN 616. The customer may desire to deploy or otherwise use resources in the data plane VCN 618 that are provisioned in the control plane VCN 616, and the data plane mirror app tier 640 can facilitate the desired deployment, or other usage of resources, of the customer.

In some embodiments, the customer of the IaaS provider can apply filters to the data plane VCN 618. In this embodiment, the customer can determine what the data plane VCN 618 can access, and the customer may restrict access to public Internet 654 from the data plane VCN 618. The IaaS provider may not be able to apply filters or otherwise control access of the data plane VCN 618 to any outside networks or databases. Applying filters and controls by the customer onto the data plane VCN 618, contained in the customer tenancy 621, can help isolate the data plane VCN 618 from other customers and from public Internet 654.

In some embodiments, cloud services 656 can be called by the service gateway 636 to access services that may not exist on public Internet 654, on the control plane VCN 616, or on the data plane VCN 618. The connection between cloud services 656 and the control plane VCN 616 or the data plane VCN 618 may not be live or continuous. Cloud services 656 may exist on a different network owned or operated by the IaaS provider. Cloud services 656 may be configured to receive calls from the service gateway 636 and may be configured to not receive calls from public Internet 654. Some cloud services 656 may be isolated from other cloud services 656, and the control plane VCN 616 may be isolated from cloud services 656 that may not be in the same region as the control plane VCN 616. For example, the control plane VCN 616 may be located in "Region 1," and cloud service "Deployment 5," may be located in Region 1 and in "Region 2." If a call to Deployment 5 is made by the service gateway 636 contained in the control plane VCN 616 located in Region 1, the call may be transmitted to Deployment 5 in Region 1. In this example, the control plane VCN 616, or Deployment 5 in Region 1, may not be communicatively coupled to, or otherwise in communication with, Deployment 5 in Region 2.

Figure 7:
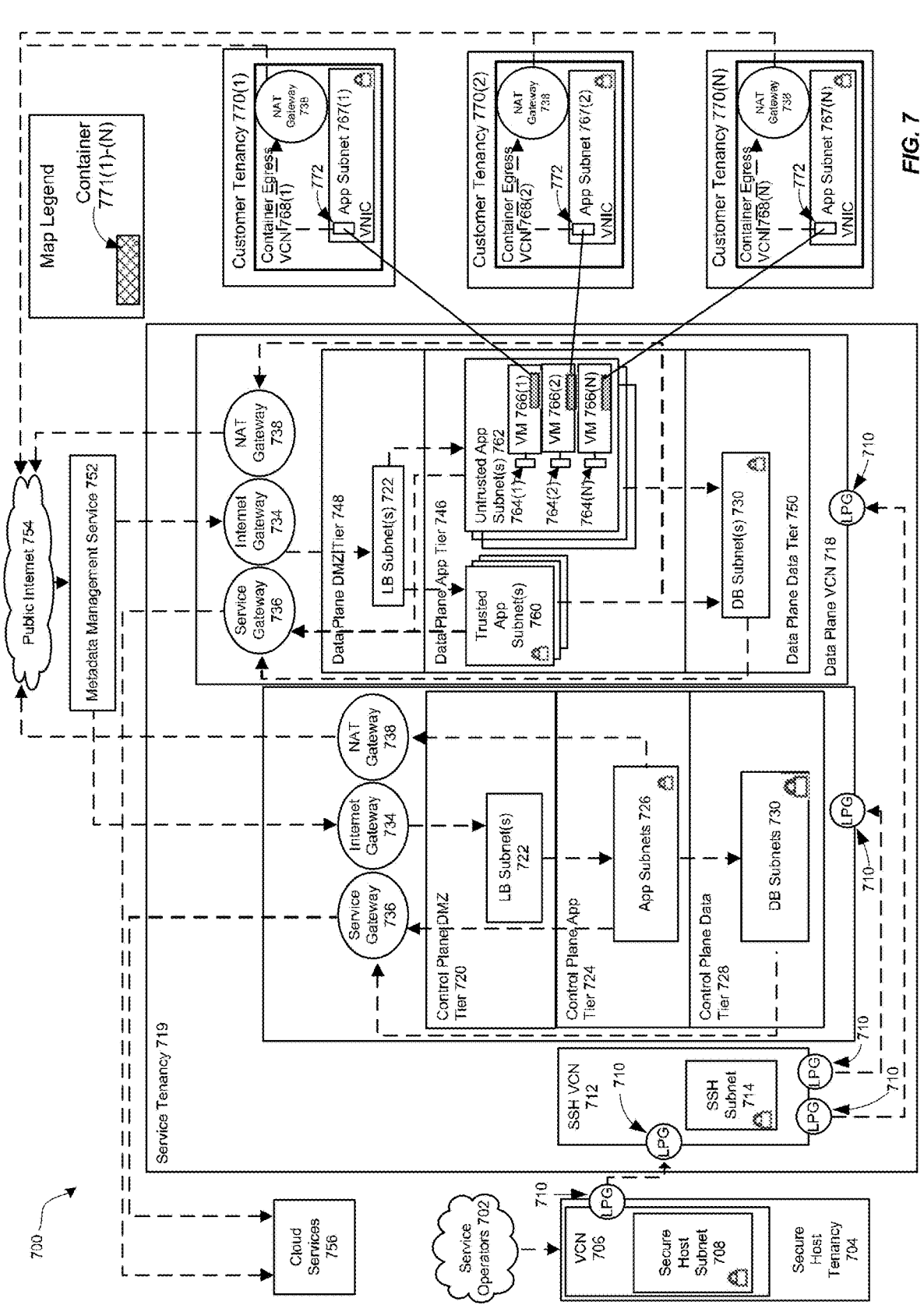
FIG. 7 is a block diagram illustrating another example pattern of an IaaS architecture, according to at least one embodiment.

FIG. 7 is a block diagram 700 illustrating another example pattern of an IaaS architecture, according to at least one embodiment. Service operators 702 (e.g., service operators 502 of FIG. 5) can be communicatively coupled to a secure host tenancy 704 (e.g., the secure host tenancy 504 of FIG. 5) that can include a virtual cloud network (VCN) 706 (e.g., the VCN 506 of FIG. 5) and a secure host subnet 708 (e.g., the secure host subnet 508 of FIG. 5). The VCN 706 can include an LPG 710 (e.g., the LPG 510 of FIG. 5) that can be communicatively coupled to an SSH VCN 712 (e.g., the SSH VCN 512 of FIG. 5) via an LPG 710 contained in the SSH VCN 712. The SSH VCN 712 can include an SSH subnet 714 (e.g., the SSH subnet 514 of FIG. 5), and the SSH VCN 712 can be communicatively coupled to a control plane VCN 716 (e.g., the control plane VCN 516 of FIG. 5) via an LPG 710 contained in the control plane VCN 716 and to a data plane VCN 718 (e.g., the data plane 518 of FIG. 5)

via an LPG 710 contained in the data plane VCN 718. The control plane VCN 716 and the data plane VCN 718 can be contained in a service tenancy 719 (e.g., the service tenancy 519 of FIG. 5).

The control plane VCN 716 can include a control plane DMZ tier 720 (e.g., the control plane DMZ tier 520 of FIG. 5) that can include load balancer (LB) subnet(s) 722 (e.g., LB subnet(s) 522 of FIG. 5), a control plane app tier 724 (e.g., the control plane app tier 524 of FIG. 5) that can include app subnet(s) 726 (e.g., similar to app subnet(s) 526 of FIG. 5), a control plane data tier 728 (e.g., the control plane data tier 528 of FIG. 5) that can include DB subnet(s) 730. The LB subnet(s) 722 contained in the control plane DMZ tier 720 can be communicatively coupled to the app subnet(s) 726 contained in the control plane app tier 724 and to an Internet gateway 734 (e.g., the Internet gateway 534 of FIG. 5) that can be contained in the control plane VCN 716, and the app subnet(s) 726 can be communicatively coupled to the DB subnet(s) 730 contained in the control plane data tier 728 and to a service gateway 736 (e.g., the service gateway of FIG. 5) and a network address translation (NAT) gateway 738 (e.g., the NAT gateway 538 of FIG. 5). The control plane VCN 716 can include the service gateway 736 and the NAT gateway 738.

The data plane VCN 718 can include a data plane app tier 746 (e.g., the data plane app tier 546 of FIG. 5), a data plane DMZ tier 748 (e.g., the data plane DMZ tier 548 of FIG. 5), and a data plane data tier 750 (e.g., the data plane data tier 550 of FIG. 5). The data plane DMZ tier 748 can include LB subnet(s) 722 that can be communicatively coupled to trusted app subnet(s) 760 and untrusted app subnet(s) 762 of the data plane app tier 746 and the Internet gateway 734 contained in the data plane VCN 718. The trusted app subnet(s) 760 can be communicatively coupled to the service gateway 736 contained in the data plane VCN 718, the NAT gateway 738 contained in the data plane VCN 718, and DB subnet(s) 730 contained in the data plane data tier 750. The untrusted app subnet(s) 762 can be communicatively coupled to the service gateway 736 contained in the data plane VCN 718 and DB subnet(s) 730 contained in the data plane data tier 750. The data plane data tier 750 can include DB subnet(s) 730 that can be communicatively coupled to the service gateway 736 contained in the data plane VCN 718.

The untrusted app subnet(s) 762 can include one or more primary VNICs 764(1)-(N) that can be communicatively coupled to tenant virtual machines (VMs) 766(1)-(N). Each tenant VM 766(1)-(N) can be communicatively coupled to a respective app subnet 767(1)-(N) that can be contained in respective container egress VCNs 768(1)-(N) that can be contained in respective customer tenancies 770(1)-(N). Respective secondary VNICs 772(1)-(N) can facilitate communication between the untrusted app subnet(s) 762 contained in the data plane VCN 718 and the app subnet contained in the container egress VCNs 768(1)-(N). Each container egress VCNs 768(1)-(N) can include a NAT gateway 738 that can be communicatively coupled to public Internet 754 (e.g., public Internet 554 of FIG. 5).

The Internet gateway 734 contained in the control plane VCN 716 and contained in the data plane VCN 718 can be communicatively coupled to a metadata management service 752 (e.g., the metadata management system 552 of FIG. 5) that can be communicatively coupled to public Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively couple to cloud services 756.

In some embodiments, the data plane VCN 718 can be integrated with customer tenancies 770. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 746. Code to run the function may be executed in the VMs 766(1)-(N), and the code may not be configured to run anywhere else on the data plane VCN 718. Each VM 766(1)-(N) may be connected to one customer tenancy 770. Respective containers 771(1)-(N) contained in the VMs 766(1)-(N) may be configured to run the code. In this case, there can be a dual isolation (e.g., the containers 771(1)-(N) running code, where the containers 771(1)-(N) may be contained in at least the VM 766(1)-(N) that are contained in the untrusted app subnet(s) 762), which may help prevent incorrect or otherwise undesirable code from damaging the network of the IaaS provider or from damaging a network of a different customer. The containers 771(1)-(N) may be communicatively coupled to the customer tenancy 770 and may be configured to transmit or receive data from the customer tenancy 770. The containers 771(1)-(N) may not be configured to transmit or receive data from any other entity in the data plane VCN 718. Upon completion of running the code, the IaaS provider may kill or otherwise dispose of the containers 771(1)-(N).

In some embodiments, the trusted app subnet(s) 760 may run code that may be owned or operated by the IaaS provider. In this embodiment, the trusted app subnet(s) 760 may be communicatively coupled to the DB subnet(s) 730 and be configured to execute CRUD operations in the DB subnet(s) 730. The untrusted app subnet(s) 762 may be communicatively coupled to the DB subnet(s) 730, but in this embodiment, the untrusted app subnet(s) may be configured to execute read operations in the DB subnet(s) 730. The containers 771(1)-(N) that can be contained in the VM 766(1)-(N) of each customer and that may run code from the customer may not be communicatively coupled with the DB subnet(s) 730.

In other embodiments, the control plane VCN 716 and the data plane VCN 718 may not be directly communicatively coupled. In this embodiment, there may be no direct communication between the control plane VCN 716 and the data plane VCN 718. However, communication can occur indirectly through at least one method. An LPG 710 may be established by the IaaS provider that can facilitate communication between the control plane VCN 716 and the data plane VCN 718. In another example, the control plane VCN 716 or the data plane VCN 718 can make a call to cloud services 756 via the service gateway 736. For example, a call to cloud services 756 from the control plane VCN 716 can include a request for a service that can communicate with the data plane VCN 718.

Figure 8:
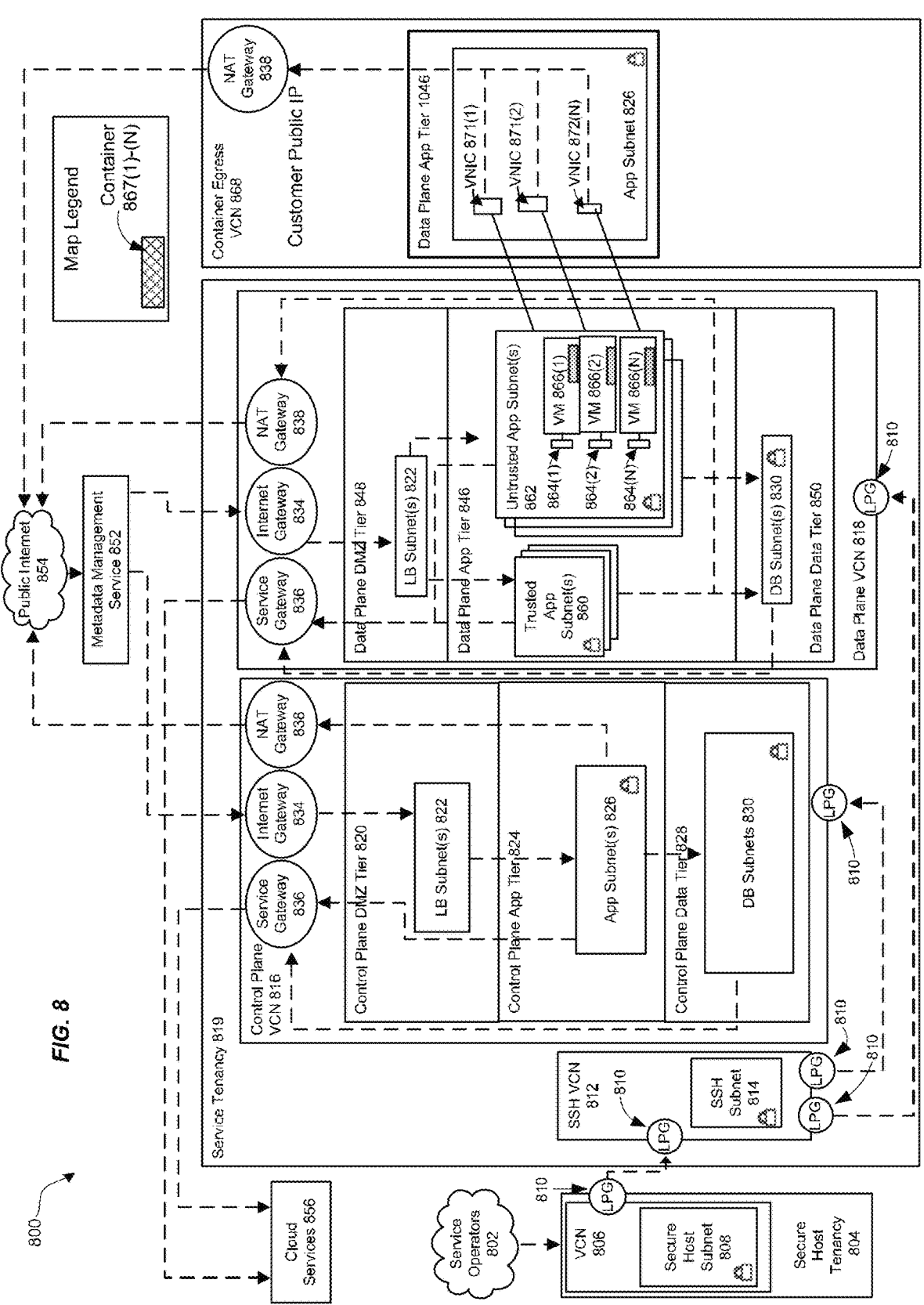
FIG. 8 is a block diagram illustrating another example pattern of an IaaS architecture, according to at least one embodiment.

FIG. 8 is a block diagram 800 illustrating another example pattern of an IaaS architecture, according to at least one embodiment. Service operators 802 (e.g., service operators 502 of FIG. 5) can be communicatively coupled to a secure host tenancy 804 (e.g., the secure host tenancy 504 of FIG. 5) that can include a virtual cloud network (VCN) 806 (e.g., the VCN 506 of FIG. 5) and a secure host subnet 808 (e.g., the secure host subnet 508 of FIG. 5). The VCN 806 can include an LPG 810 (e.g., the LPG 510 of FIG. 5) that can be communicatively coupled to an SSH VCN 812 (e.g., the SSH VCN 512 of FIG. 5) via an LPG 810 contained in the SSH VCN 812. The SSH VCN 812 can include an SSH subnet 814 (e.g., the SSH subnet 514 of FIG. 5), and the SSH VCN 812 can be communicatively coupled to a control plane VCN 816 (e.g., the control plane VCN 516 of FIG. 5) via an LPG 810 contained in the control plane VCN 816 and to a data plane VCN 818 (e.g., the data plane 518 of FIG. 5) via an LPG 810 contained in the data plane VCN 818. The control plane VCN 816 and the data plane VCN 818 can be contained in a service tenancy 819 (e.g., the service tenancy 519 of FIG. 5).

The control plane VCN 816 can include a control plane DMZ tier 820 (e.g., the control plane DMZ tier 520 of FIG. 5) that can include LB subnet(s) 822 (e.g., LB subnet(s) 522 of FIG. 5), a control plane app tier 824 (e.g., the control plane app tier 524 of FIG. 5) that can include app subnet(s) 826 (e.g., app subnet(s) 526 of FIG. 5), a control plane data tier 828 (e.g., the control plane data tier 528 of FIG. 5) that can include DB subnet(s) 830 (e.g., DB subnet(s) 730 of FIG. 7). The LB subnet(s) 822 contained in the control plane DMZ tier 820 can be communicatively coupled to the app subnet(s) 826 contained in the control plane app tier 824 and to an Internet gateway 834 (e.g., the Internet gateway 534 of FIG. 5) that can be contained in the control plane VCN 816, and the app subnet(s) 826 can be communicatively coupled to the DB subnet(s) 830 contained in the control plane data tier 828 and to a service gateway 836 (e.g., the service gateway of FIG. 5) and a network address translation (NAT) gateway 838 (e.g., the NAT gateway 538 of FIG. 5). The control plane VCN 816 can include the service gateway 836 and the NAT gateway 838.

The data plane VCN 818 can include a data plane app tier 846 (e.g., the data plane app tier 546 of FIG. 5), a data plane DMZ tier 848 (e.g., the data plane DMZ tier 548 of FIG. 5), and a data plane data tier 850 (e.g., the data plane data tier 550 of FIG. 5). The data plane DMZ tier 848 can include LB subnet(s) 822 that can be communicatively coupled to trusted app subnet(s) 860 (e.g., trusted app subnet(s) 760 of FIG. 7) and untrusted app subnet(s) 862 (e.g., untrusted app subnet(s) 762 of FIG. 7) of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include primary VNICs 864(1)-(N) that can be communicatively coupled to tenant virtual machines (VMs) 866(1)-(N) residing within the untrusted app subnet(s) 862. Each tenant VM 866(1)-(N) can run code in a respective container 867(1)-(N), and be communicatively coupled to an app subnet 826 that can be contained in a data plane app tier 846 that can be contained in a container egress VCN 868. Respective secondary VNICs 872(1)-(N) can facilitate communication between the untrusted app subnet(s) 862 contained in the data plane VCN 818 and the app subnet contained in the container egress VCN 868. The container egress VCN can include a NAT gateway 838 that can be communicatively coupled to public Internet 854 (e.g., public Internet 554 of FIG. 5).

The Internet gateway 834 contained in the control plane VCN 816 and contained in the data plane VCN 818 can be communicatively coupled to a metadata management service 852 (e.g., the metadata management system 552 of FIG. 5) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some examples, the pattern illustrated by the architecture of block diagram 800 of FIG. 8 may be considered an exception to the pattern illustrated by the architecture of block diagram 700 of FIG. 7 and may be desirable for a customer of the IaaS provider if the IaaS provider cannot directly communicate with the customer (e.g., a disconnected region). The respective containers 867(1)-(N) that are contained in the VMs 866(1)-(N) for each customer can be accessed in real-time by the customer. The containers 867 (1)-(N) may be configured to make calls to respective secondary VNICs 872(1)-(N) contained in app subnet(s) 826 of the data plane app tier 846 that can be contained in the container egress VCN 868. The secondary VNICs 872(1)- (N) can transmit the calls to the NAT gateway 838 that may transmit the calls to public Internet 854. In this example, the containers 867(1)-(N) that can be accessed in real-time by the customer can be isolated from the control plane VCN 816 and can be isolated from other entities contained in the data plane VCN 818. The containers 867(1)-(N) may also be isolated from resources from other customers.

In other examples, the customer can use the containers 867(1)-(N) to call cloud services 856. In this example, the customer may run code in the containers 867(1)-(N) that requests a service from cloud services 856. The containers 867(1)-(N) can transmit this request to the secondary VNICs 872(1)-(N) that can transmit the request to the NAT gateway that can transmit the request to public Internet 854. Public Internet 854 can transmit the request to LB subnet(s) 822 contained in the control plane VCN 816 via the Internet gateway 834. In response to determining the request is valid, the LB subnet(s) can transmit the request to app subnet(s) 826 that can transmit the request to cloud services 856 via the service gateway 836.

It should be appreciated that IaaS architectures 500, 600, 700, 800 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 9:
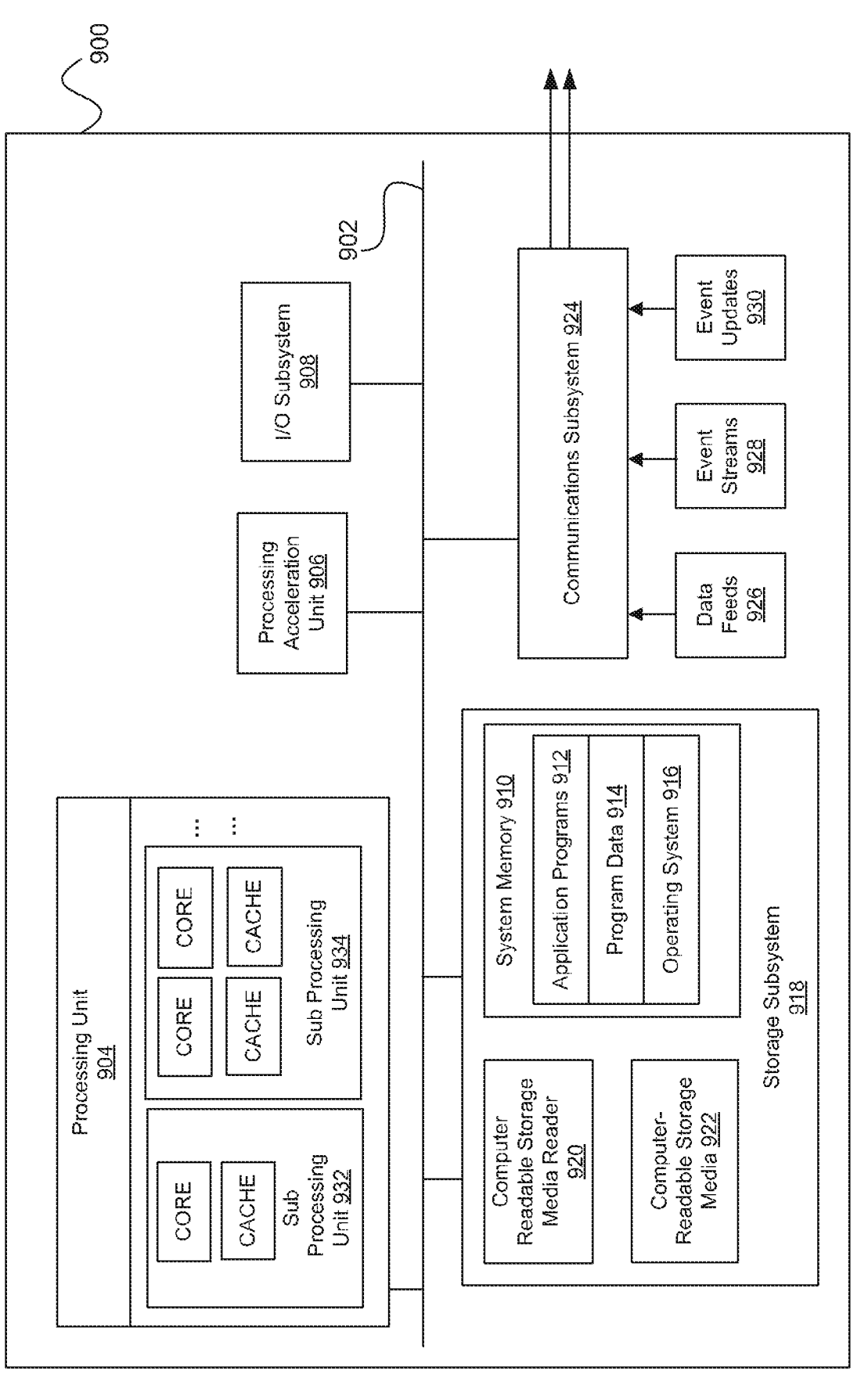
FIG. 9 illustrates an example computer system, in which various embodiments may be implemented.

FIG. 9 illustrates an example computer system 900, in which various embodiments may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 904 provide the functionality described above. Storage subsystem 918 may also provide a repository for storing data used in accordance with the present disclosure.

As depicted in the example in FIG. 9, storage subsystem 918 can include various components including a system memory 910, computer-readable storage media 922, and a computer readable storage media reader 920. System memory 910 may store program instructions that are loadable and executable by processing unit 904. System memory 910 may also store data that is used during the execution of the instructions and/or data that is generated during the execution of the program instructions. Various different kinds of programs may be loaded into system memory 910 including but not limited to client applications, Web browsers, mid-tier applications, relational database management systems (RDBMS), virtual machines, containers, etc.

System memory 910 may also store an operating system 916. Examples of operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows®Phone, Android® OS, BlackBerry® OS, and Palm® OS operating systems. In certain implementations where computer system 900 executes one or more virtual machines, the virtual machines along with their guest operating systems (GOSs) may be loaded into system memory 910 and executed by one or more processors or cores of processing unit 904.

System memory 910 can come in different configurations depending upon the type of computer system 900. For example, system memory 910 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 910 may include a basic input/output system (BIOS) containing basic routines that help to transfer information between elements within computer system 900, such as during start-up.

Computer-readable storage media 922 may represent remote, local, fixed, and/or removable storage devices plus storage media for temporarily and/or more permanently containing, storing, computer-readable information for use by computer system 900 including instructions executable by processing unit 904 of computer system 900.

Computer-readable storage media 922 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Machine-readable instructions executable by one or more processors or cores of processing unit 904 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. One or more computer-readable non-transitory storage media embodying software that is operable when executed to:

receive, by a mid-tier video transformer, a first request for a first video fragment from a first content delivery network (CDN) among a plurality of CDNs, wherein the mid-tier video transformer operates between the plurality of CDNs and a plurality of servers;

determine, by the mid-tier video transformer, a type of the first request based on one or more parameters associated with the first request;

identify, based on the type of the first request and by the mid-tier video transformer, one or more first configuration rules among a plurality of configuration rules to transform the first request, wherein the plurality of configuration rules are centralized in the mid-tier video transformer;

determine, based on the one or more first configuration rules and by the mid-tier video transformer, a first media type associated with the first video fragment;

identify, based on the first media type of the first video fragment and by the mid-tier video transformer, a first server from the plurality of servers; and route, by the mid-tier video transformer, a transformed request to the first server.

2. The media of claim 1, wherein the software that is further operable when executed to:

receive, by the mid-tier video transformer, the first video fragment from the first server; and transmit, by the mid-tier video transformer, the first video fragment to the first CDN.

3. The media of claim 1, wherein the plurality of configuration rules is generic to the plurality of CDNs.

4. The media of claim 1, wherein the plurality of configuration rules is decoupled from each of the plurality of CDNs.

5. The media of claim 1, wherein the type of the first request is video-on-demand (VOD).

6. The media of claim 1, wherein the software is further operable when executed to:

receive, by the mid-tier video transformer, a plurality of concurrent second requests from the plurality of CDNs;

determine, by the mid-tier video transformer, the plurality of concurrent second requests request a same second video fragment;

merge the plurality of concurrent second requests into a single request; and route, by the mid-tier video transformer, the single request to a second server.

7. The media of claim 6, wherein the software is further operable when executed to:

receive, by the mid-tier video transformer, the same second video fragment from the second server; and transmit, by the mid-tier video transformer, the same second video fragment to the plurality of CDNs.

8. The media of claim 1, wherein the mid-tier video transformer comprises a cache configured to store recent video fragments, wherein the software is further operable when executed to:

upon receiving the first request for the first video fragment, search the cache for the first video fragment.

9. The media of claim 1, wherein the first server is associated with a first server endpoint, and wherein the transformed request specifies the first video fragment and the first server endpoint.

10. The media of claim 1, wherein the software is further operable when executed to:

receive, by the mid-tier video transformer, a plurality of second requests for a plurality of second video fragments from each of the plurality of CDNs;

identify, by the mid-tier video transformer, one or more respective second configuration rules among the plurality of configuration rules to transform each of the plurality of second requests;

determine, based on the one or more respective second configuration rules and by the mid-tier video transformer, a respective second media type associated with each of the plurality of second video fragments;

identify, based on the respective second media type of each of the plurality of second video fragments and by the mid-tier video transformer, one or more second servers from the plurality of servers; and route, by the mid-tier video transformer, a plurality of transformed requests corresponding to the plurality to second requests to the one or more second servers.

11. The media of claim 1, wherein the plurality of CDNs operate on a cloud infrastructure.

12. The media of claim 1, wherein the first request comprises a URL, wherein the software is further operable when executed to:

identify, by the mid-tier video transformer, a pattern associated with the URL;

wherein determining the first media type associated with the first video fragment is further based on the pattern associated with the URL.

13. The media of claim 12, wherein the software is further operable when executed to:

generate, by the mid-tier video transformer, the transformed request based on one or more of normalizing a name of the first video fragment, transforming the URL, appending a parameter, removing a parameter, or reconstructing a request path to point to the first server.

14. The media of claim 1, wherein the software is further operable when executed to:

determine, by the mid-tier video transformer, that the first CDN is authorized to use functions provisioned by the mid-tier video transformer.

15. The media of claim 1, wherein the software is further operable when executed to:

receive, by the mid-tier video transformer, a plurality of second requests from the first CDN;

calculate a request rate associated with the plurality of second requests;

determine the request rate exceeds a rate limit; and decline the plurality of second requests or suspend one or more of the plurality of second requests for a period of time.

16. The media of claim 15, wherein the software is further operable when executed to:

request, by the mid-tier video transformer, validations for the plurality second requests from the first CDN prior to declining the plurality of second requests or suspending the one or second requests.

17. The media of claim 1, wherein one or more second servers store the first media type of video fragments, wherein the software is further operable when executed to:

determine, by the mid-tier video transformer, a load balancing between the first server and the one or more second servers, wherein identifying the first server is further based on the load balancing.

18. The media of claim 17, wherein the software is further operable when executed to:

determine a failure associated with the first server; and route, by the mid-tier video transformer, the transformed request to one of the one or more second servers.

19. A system comprising: one or more processors; and a non-transitory memory coupled to the processors comprising instructions, when executed using the processors, cause the processors to execute:

receiving, by a mid-tier video transformer, a first request for a first video fragment from a first content delivery network (CDN) among a plurality of CDNs, wherein the mid-tier video transformer operates between the plurality of CDNs and a plurality of servers;

determining, by the mid-tier video transformer, a type of the first request based on one or more parameters associated with the first request;

identifying, based on the type of the first request and by the mid-tier video transformer, one or more first configuration rules among a plurality of configuration rules to transform the first request, wherein the plurality of configuration rules are centralized in the mid-tier video transformer;

determining, based on the one or more first configuration rules and by the mid-tier video transformer, a first media type associated with the first video fragment;

identifying, based on the first media type of the first video fragment and by the mid-tier video transformer, a first server from the plurality of servers; and routing, by the mid-tier video transformer, a transformed request to the first server.

20. A method comprising, by one or more computing systems:

receiving, by a mid-tier video transformer, a first request for a first video fragment from a first content delivery network (CDN) among a plurality of CDNs, wherein the mid-tier video transformer operates between the plurality of CDNs and a plurality of servers;

determining, by the mid-tier video transformer, a type of the first request based on one or more parameters associated with the first request;

identifying, based on the type of the first request and by the mid-tier video transformer, one or more first configuration rules among a plurality of configuration rules to transform the first request, wherein the plurality of configuration rules are centralized in the mid-tier video transformer;

determining, based on the one or more first configuration rules and by the mid-tier video transformer, a first media type associated with the first video fragment;

identifying, based on the first media type of the first video fragment and by the mid-tier video transformer, a first server from the plurality of servers; and routing, by the mid-tier video transformer, a transformed request to the first server.

* * * * *